(12) United States Patent
Brown et al.

(10) Patent No.: US 6,601,041 B1
(45) Date of Patent: Jul. 29, 2003

(54) METHOD OF PROVIDING TARGETED ADVERTISEMENTS TO A COMPUTER MEDIATED COMMUNICATIONS NETWORK

(76) Inventors: Yale Robert Brown, 3713 S. George Mason Dr., #1609 W., Falls Church, VA (US) 22041; Matthew Brown Walker, 4714 25th Rd., Arlington, VA (US) 22207

( * ) Notice: Subject to any disclaimer, the term of this patent is extended or adjusted under 35 U.S.C. 154(b) by 0 days.

(21) Appl. No.: 09/660,360

(22) Filed: Sep. 12, 2000

Related U.S. Application Data

(63) Continuation of application No. 09/438,540, filed on Nov. 12, 1999, which is a continuation of application No. 08/503,268, filed on Jul. 17, 1995, now Pat. No. 6,026,368.

(51) Int. Cl.[7] .......................... G06F 17/60; G06F 17/00
(52) U.S. Cl. ........................................................ 705/14
(58) Field of Search ........................................... 705/14

(56) References Cited

U.S. PATENT DOCUMENTS

| | | | |
|---|---|---|---|
| 4,674,041 A | 6/1987 | Lemon et al. | |
| 4,703,423 A | 10/1987 | Bado et al. | 709/202 |
| 4,789,235 A | 12/1988 | Borah et al. | |
| 4,850,007 A | 7/1989 | Marino et al. | |
| 5,099,422 A | 3/1992 | Foresman et al. | |
| 5,105,184 A | 4/1992 | Pirani et al. | |
| 5,220,501 A | 6/1993 | Lawlor et al. | |
| 5,239,648 A | 8/1993 | Nukui | |
| 5,283,731 A * | 2/1994 | Lalonde et al. | 705/1 |
| 5,291,594 A | 3/1994 | Sekiguchi et al. | |
| 5,297,249 A | 3/1994 | Bernstein et al. | |
| 5,305,195 A | 4/1994 | Murphy | |
| 5,347,632 A * | 9/1994 | Filepp et al. | 709/202 |
| 5,355,161 A * | 10/1994 | Bird et al. | 725/22 |
| 5,361,393 A | 11/1994 | Rossillo | |
| 5,377,354 A | 12/1994 | Scannell et al. | |
| 5,442,771 A | 8/1995 | Filepp et al. | |
| 5,446,919 A | 8/1995 | Wilkins | |
| 5,491,838 A * | 2/1996 | Takahisa et al. | 455/66 |
| 5,499,046 A | 3/1996 | Schiller et al. | |
| 5,515,270 A | 5/1996 | Weinblatt | |
| 5,566,353 A | 10/1996 | Cho et al. | |
| 5,584,025 A | 12/1996 | Keithley et al. | |
| 5,594,910 A | 1/1997 | Filepp et al. | |
| 5,636,346 A | 6/1997 | Saxe | |
| 5,664,948 A * | 9/1997 | Dimitriadis et al. | 434/307 |

(List continued on next page.)

FOREIGN PATENT DOCUMENTS

WO      WO 95/15657      6/1995

OTHER PUBLICATIONS

Dunn et al, "Advertising, Its Role in Modern Marketing", 1990, The Dryden Press, 7th Edition, pp 375–378.*

(List continued on next page.)

*Primary Examiner*—James W. Myhre

(57) ABSTRACT

Prioritized queues of advertising and content data are generated by a queue builder and sent to an on-line queue manager. A computer mediated communications network provides content and subscriber data to the queue builder and receives content segment play lists from the on-line queue manager. An exposure accounting module calculates and stores information about the number of exposures of targeted material received by subscribers and generates billing information. An information warehouse manager is employed to receive data from advertisers' data bases and third party sources as well as from the computer mediated communications network.

14 Claims, 11 Drawing Sheets

U.S. PATENT DOCUMENTS

| | | | |
|---|---|---|---|
| 5,692,132 A | | 11/1997 | Hogan |
| 5,717,923 A | | 2/1998 | Dedrick |
| 5,724,521 A | * | 3/1998 | Dedrick ................. 705/26 |
| 5,740,549 A | * | 4/1998 | Reilly et al. ............ 705/14 |
| 5,745,882 A | * | 4/1998 | Bixler et al. ............ 705/26 |
| 5,745,938 A | | 5/1998 | Bartley et al. |
| 5,754,938 A | * | 5/1998 | Herz et al. ............ 725/116 |
| 5,754,939 A | * | 5/1998 | Herz et al. ............ 455/3.04 |
| 5,761,601 A | | 6/1998 | Nemirofsky et al. |
| 5,768,521 A | | 6/1998 | Dedrick |
| 5,796,945 A | | 8/1998 | Tarabella |
| 5,812,647 A | * | 9/1998 | Beaumont et al. ....... 379/111 |
| 5,848,397 A | * | 12/1998 | Marsh et al. ............ 705/14 |
| 5,870,724 A | | 2/1999 | Lawlor et al. |
| 5,873,068 A | * | 2/1999 | Beaumont et al. ....... 705/14 |
| 5,941,953 A | | 8/1999 | Bergmann et al. |
| 5,956,716 A | | 9/1999 | Kenner et al. |
| 6,026,368 A | | 2/2000 | Brown et al. |
| 6,377,935 B1 | * | 4/2002 | Deaton et al. ............ 705/14 |

OTHER PUBLICATIONS

"Under the Hood: The Hewlett–Packard Mediastream Server for Supplying Video–on–Demand", Computergram International, Jan. 17, 1995, No. 2582.

D. Zinman et al, "LinkMarket", Jun. 15, 1995.

"The Handbook", Copyright 1990, Prodigy Services Company.

* cited by examiner

METHOD OF PROVIDING TARGETED ADVERTISEMENTS TO A COMPUTER MEDIATED COMMUNICATIONS NETWORK

This is a continuation application of U.S. Ser. No. 09/438,540, filed Nov. 12, 1999, which is a continuation application of U.S. Ser. No. 08/503,268, filed Jul. 17, 1995, now U.S. Pat. No. 6,026,368.

FIELD OF THE INVENTION

The present invention is directed to a system to be used in conjunction with various on-line networks that are both now in existence and yet to be created in the future. The system will assemble and provide content and advertising information to the network so as to be preferably distributed to a targeted set of viewers.

BACKGROUND OF THE INVENTION

It has been known in the prior art that targeted advertisements can be used in conjunction with a network for an interactive service as disclosed in U.S. Pat. No. 5,347,632 to Prodigy Services Company. However, this patent does not disclose how advertisement queues that are intelligently prioritized and interactively updated are built. Thus, although the patent discloses that on-line networks can be used to deliver targeted advertisements, it does not disclose the mechanism for building targeted queues accounting for the exposures of users to those ads, and the real-time management of priorities, frequencies, and types of content to be shown.

Other targeted advertising systems have been known such as U.S. Pat. No. 5,099,422. According to this system, a customized video cassette is prepared based on a persons' demographic and zip code information. A relational operation program is used to cause certain items of information to be retrieved from a customized memory for determining which segments are to be used and in which order they are to be recorded onto the videocassette. Unlike the present invention, there is no disclosure of a complete targeting system for on-line media that is both interactive and intelligent.

SUMMARY OF THE INVENTION

The present invention is directed to a targeting system and method that is both interactive and intelligent. Accordingly, the system according to the present invention includes some or all of the following major components: a queue builder for generating priority queues, a computer mediated communications network for sending content data and subscriber data to the queue builder, an on-line queue manager for receiving the priority queues from the queue builder and for sending content segment play lists to the computer mediated communications network, and an exposure accounting module for receiving exposure data from the on-line queue manager and computing and outputting exposure billing data.

The exposure accounting module includes an exposure billing module, a contract maintenance module, and an exposure accounting storage. The exposure billing module receives data stored in the exposure storage of the on-line queue manager and data is transmitted from the exposure billing module and the contracts maintenance module to the targeting data storage of the queue builder.

Preferably, the system also includes an information warehouse manager coupled to the exposure accounting module and including an importer/translator, an information warehouse controller and an information warehouse storage. The importer/translator receives data from an advertiser customer database and a third party database.

The queue builder according to the present invention preferably includes a targeting data storage coupled to a queue generator for generating the priority queues according to predetermined rules and profile definitions contained in the targeting data storage. Also, the on-line queue manager includes a priority queue storage for receiving the priority queues output from the queue generator. The priority queue storage is connected to the computer mediated communications.

The computer mediated communications network preferably includes an on-line application server connected between a plurality of subscribers and the on-line queue manager.

An object of the present invention is to provide a system for providing advertising and content information in an intelligently prioritized manner to an interactive computer mediated communications network including a queue builder for gathering content and advertising information, combining the information gathered with predefined rules, and outputting prioritized queues resulting from the combination, and an on-line queue manager for receiving the prioritized queues and outputting play lists to the interactive network host server in real-time. The queue builder includes a targeting data storage coupled to a queue generator for generating the priority queues according to predetermined rules and profile definitions contained in the targeting data storage.

Another object of the present invention is to provide a system for providing targeted information to a user in an on-line computer mediated communication including a queue builder for combining a targeting data storage with a plurality of editors and outputting resulting data to a queue generator, and an on-line queue manager including a priority queue storage which receives data from the queue generator. The on-line queue manager also including a queue server coupled to the priority queue storage and connected to a server for an on-line information service via a request broker and a network interface.

The system according to the present invention also includes an exposure accounting module including an exposure billing module, a contract maintenance module, and an exposure accounting storage. The exposure billing module receives data stored in the exposure storage of the on-line queue manager. Preferably, data is transmitted from the exposure billing module and the contracts maintenance module to the targeting data storage of the queue builder.

These and other objects, features and advantages of the present invention will become more apparent in view of the following detailed description.

DETAILED DESCRIPTION OF THE PREFERRED EMBODIMENTS

The present invention will now be described according to preferred embodiments of the present invention and in connection with the accompanying Figures.

Overview

Figure 1:
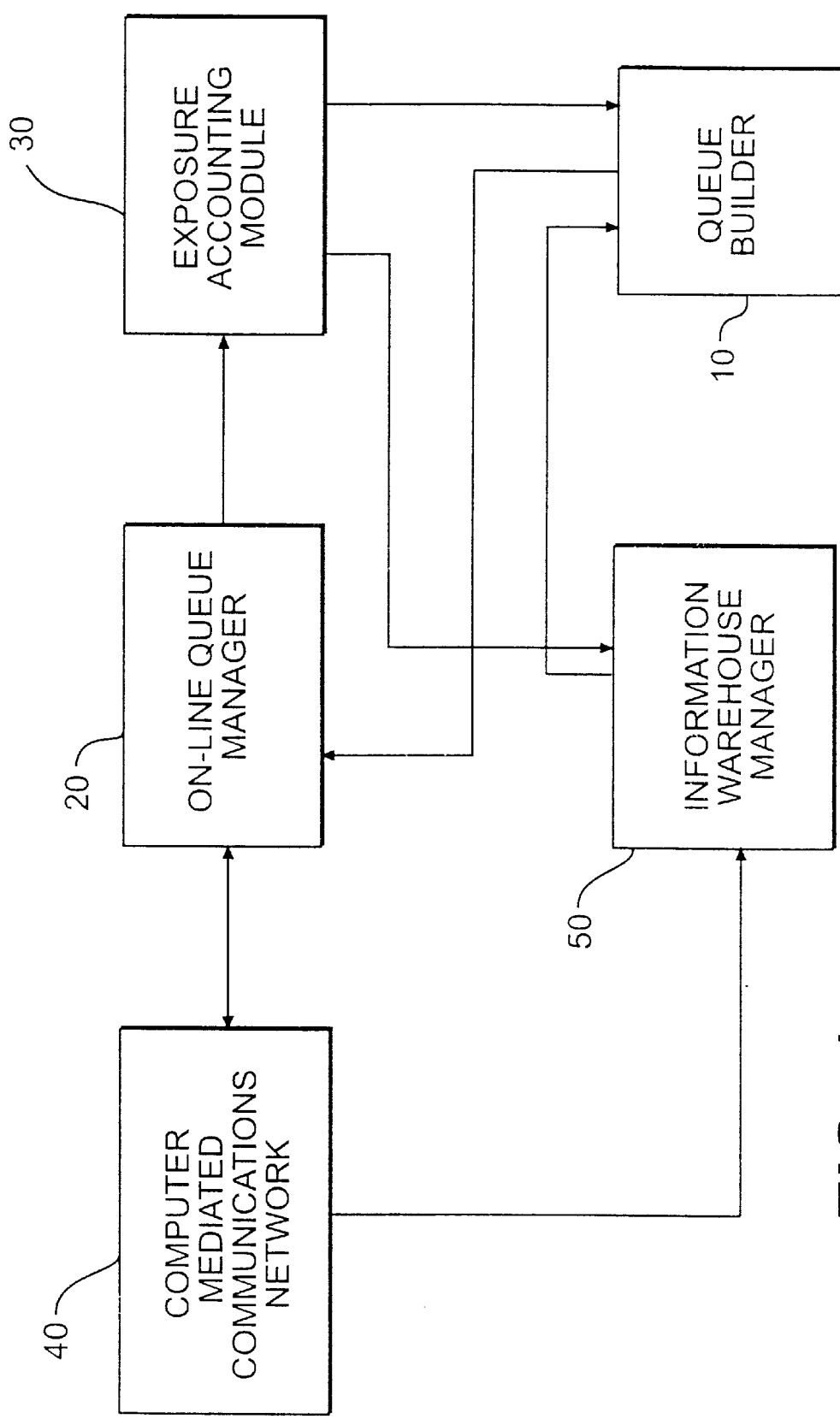
FIG. 1 illustrates an overall block diagram of the system according to a preferred embodiment of the present invention.

A preferred embodiment of the overview of the system is shown in FIG. 1. As shown in FIG. 1, the system includes five major components: the queue builder 10, the on-line queue manager 20, the exposure accounting module 30 the computer mediated communications network 40 and the information warehouse manager 50. Implemented as a whole, the system provides a mechanism for targeting content in a computer mediated communication network or other medium.

The system takes data input from providers of information and/or access services in the computer mediated communications network 40. Data is provided that uniquely identifies and describes subscribers to the communications/information service. Additional data is provided that uniquely identifies and describes the content segments that will be targeted. Finally, data is provided by the provider of the computer mediated communications network 40 that uniquely identifies and describes content or application locations within the service where targeting requests may be generated. In addition to data from the communications network provider, third party data that describes the subscribers may also be input into the queue builder 10 from third party databases 44. The information warehouse manager 50 will attach this third party data to the existing subscriber data base to provide more information for creating profiles of populations within the subscriber base. Within the queue builder 10, the input data is put into a relational data base where the subscriber, content segment, and content location data can be analyzed and manipulated by rule developers. It is to be understood that all of the data storages are accessed by a relational data base system (not shown), such as products currently available from Oracle (Oracle 7), Sybase or Informix. These rule developers can create profiles of subscribers, content segments, and content locations; and can create definitions of specific time periods that may be important in targeting content segments to subscribers. Once the profiles are defined and housed in the relational data base, the rule developers can target content segments to specific users, to content locations, or to time periods by creating a rule that defines the priority of a specific content segment for a specific subscriber, subscriber profile, content location, content location profile, or time period definition. The rules are housed in a targeting data storage 100.

Once the data are loaded, the profiles are established, and the rules are developed, the queue generator 140 within the queue builder 10 creates priority queues of content segments for each identified subscriber, content location and time period definition. These queues are passed from the queue builder 10 to the on-line queue manager 20 over a dedicated network connection. The on-line queue manager 20 places the queues in a relational data base. Through a set of standard function calls that are imbedded in the applications of the communications service, these applications send requests for content segment play lists to the on-line queue manager 20. The requests identify the current subscriber, the content location of the request, the date and time of the request, and the type of content record (e.g. advertisement, movie, still picture, etc). The on-line queue manager 20 returns a play list of content segments that are targeted to the subscriber, location, and time period identified in the request. In addition, the on-line queue manager 20 records the response to the request as an exposure of the content segment(s) included in the play list.

Exposure data is housed in the relational data base within the on-line queue manager 20. Through standard function calls that are imbedded in the applications of the communications service, applications within the service network can send exposure data update requests to add subscriber interaction information (e.g. how long was the segment exposed to the subscriber, did the subscriber cancel the segment, etc.) to the existing exposure records. On a periodic basis, the exposure data housed in the relational data base is exported to the exposure accounting module 30.

The exposure accounting module 30 provides summary and detailed exposure billing data to customers of the programming engine (e.g. the owners of the calling applications on the communications network 40, advertisers, etc.). Information regarding the financial terms of commitments to deliver exposures to applications within the communications network 40 are entered into the exposure accounting module 30 and stored in a relational data base within the module.

Contract data includes the customer identification and billing information. In addition, the exposure accounting module 30 provides a facility to input and maintain simple information about the targeting campaigns that will be executed under the current contract. This campaign data is used by rule analysts to develop the appropriate profiles and rules to satisfy the objectives defined in the contracts data base. Pricing information is also assigned to various campaigns under each contract. When rule analysts develop rules, they are related to a specific campaign within the contracts data base. Exposure records that are imported regularly from the on-line queue manager 20, identify the rule that was used to generate each exposure. Using the exposure data and the contract data the exposure accounting module 30 assigns a price to each exposure and generates reports and export files to be delivered to customers.

System Configuration

There are several high level hardware and system architectures that can be implemented to realize the invention. One end of the spectrum of possible implementations is that every logical component of the invention (i.e. the Information Warehouse Manager, the Queue Builder, the Exposure Accounting Module, and the On-Line Queue Manager) is deployed on its own hardware platform. In fact, this implementation will be necessary when the number of subscribers, and content segments get sufficiently large (for example, when an excess of 2,000,000 subscribers will be targeted by more than 20 advertisers). The other end of the implementation spectrum would be to implement the three off-line components (i.e. the Information Warehouse Manager, the Queue Builder, and the Exposure Accounting Module) on a single hardware platform. This implementation of the invention will be feasible in support of smaller on-line services where the number of subscribers and advertisers is relatively small.

In either implementation of the architecture the on-line queue manager 20 should be implemented on a hardware platform that is dedicated to a particular on-line service application. Typically this hardware is located on or near the on-line application server that houses applications that will call the on-line queue manager 20. The on-line queue manager platform houses each of the processing components of the on-line queue manager 20: the network interface 210, the request broker 220, the queue server 240, and the exposure status server 230.

In addition this platform hosts a relational data base access program which controls and manages access to the priority queue storage 250 and the exposure storage 200.

The data files for these data bases are preferably housed on disk storage units attached to the on-line queue manager platform. The on-line queue manager platform is directly connected to the computer that hosts the on-line service applications that will request play lists from the on-line queue manager. Dial-up or dedicated telecommunications connections to the off-line processing components of the invention will be installed on this platform. These telecommunications connections will allow for the off-line components to reside in remote geographic locations relative to the on-line queue manager site.

Through telecommunications links, exposure status data is transferred to the exposure accounting module on a regular basis. In an architecture that must support a large number of advertisers, content segments and subscribers, the remaining logical components of the processing components of the exposure accounting module 30 (i.e. the contracts maintenance module 310 and the exposure billing module 300) should be deployed on a single computing platform. The data files that support these processing components are preferably housed on dedicated disk storage units.

One of these disk storage units, the targeting disk storage 100, is used to house the targeting data and rules that will be used to generate the priority queues. The targeting disk storage 100 is accessed primarily by the queue builder 10, but can be accessed by the exposure accounting module 30 to adjust priorities for campaigns that are in danger of not meeting exposure goals. The exposure accounting module 30 will also generate rules to ensure that subscriber cancellation requests are fulfilled.

The queue builder processing components will also be implemented on an independent computer processing platform. The data used to build queues, and the priority queues that are generated by the queue builder 10 will be housed on a disk storage device that is accessed by the other two off-line components of the invention. Once the priority queues are generated, they will be transferred through the telecommunications connection to the on-line queue manager 20. The data will be transferred to the disk storage device dedicated to the on-line queue manager 20 after every new set of priority queues is generated. The data that is used to develop subscriber and content segment profiles is loaded into the targeting data base 100 by the information warehouse manager 50.

The information warehouse manager 50 is preferably implemented on its own computing platform which will be capable of reading multiple physical media formats for incoming data from third parties, advertisers, and on-line information services. This data will be read from electronic files on diskettes, tapes, and files sent through telecommunications lines into the importer/translator processing module 500. From there the data is written to a disk storage device (the information warehouse storage 520) that is dedicated to the information warehouse manager. When import sessions are run, data is read from the information warehouse storage 500, translated, mapped, and written to data structures in the targeting data storage 100. All of the off-line processing components of the invention preferably access the data on the disk storage devices through a distributed relational data base manager. The relational data base manager according to the present invention will preferably be deployed on individual computing hardware platforms.

Alternatively, the information warehouse manager 50, the queue builder 10, and the exposure accounting module 30 can be deployed on the same computing platform using a shared disk storage device. As in the case of the distributed architecture, the data would be accessed and managed using the relational data base manager. The computing platform would be connected to the on-line queue manager 20 through dedicated telecommunications lines. These lines would be used to transfer priority queues to the on-line queue manager 20, and exposure status data from the on-line queue manager 20 on a regular basis.

The Overall System

FIG. 1 illustrates a preferred embodiment of the overall system according to the present invention. A computer mediated communications network 40 exchanges requests and responses with an on-line queue manager 20. The computer mediated communications network 40 also communicates with an information warehouse manager 50 by transferring content description and subscriber descriptive data. The information warehouse manager 50 in turn sends basic descriptive data to a queue builder 10, which also receives some queue building rules from an exposure accounting module 30. The exposure accounting module 30 also provides data source control information to the information warehouse manager 50. The queue builder 10 develops prioritized queues and sends them to the on-line queue manager 20.

A more detailed description of the specific interaction between the major components of the system outlined above is provided below.

The Computer Mediated Network 40

Figure 2:
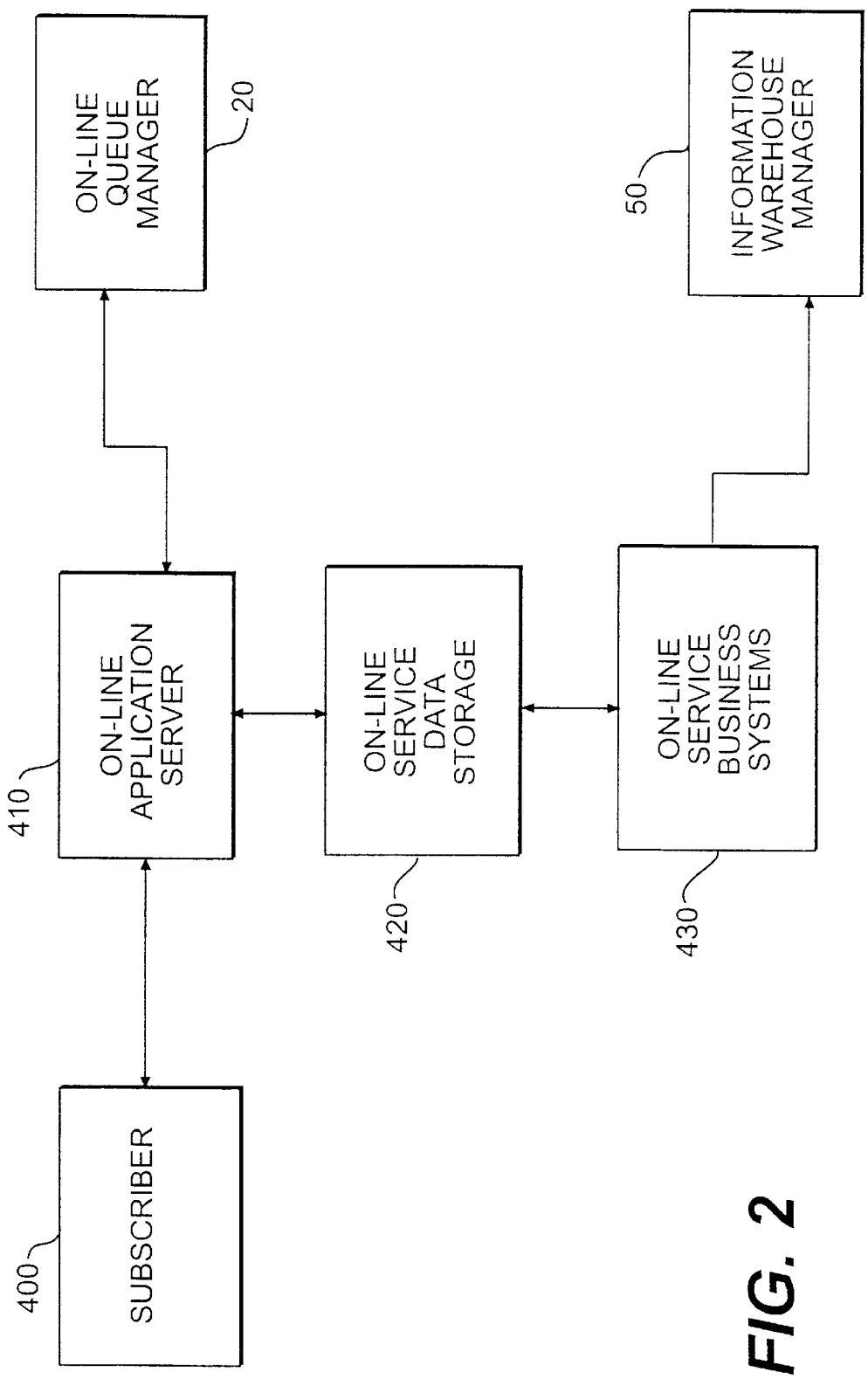
FIG. 2 illustrates a more detailed block diagram of the Computer Mediated Network of FIG. 1.

A more detailed block diagram of the computer mediated network 40 is shown in FIG. 2. The computer mediated network is shown along with its connections with the on-line queue manager 20 and the information warehouse manager 50. An on-line application server 410 exchanges information with a subscriber 400 as well as the on-line queue manager 20. The on-line application server 410 is connected to an on-line service data storage 420, which holds subscriber account data, other business data, and content files (ie. content segments). This data storage is interconnected to an on-line service business system 430. The on-line service business system 430 sends information out to the information warehouse manager 50.

It is to be understood that the computer mediated network 40 can be embodied in a number of different ways and that the embodiment shown in FIG. 2 is a preferred realization of the network as contemplated by the present inventors.

The Information Warehouse Manager 50

Figure 3:
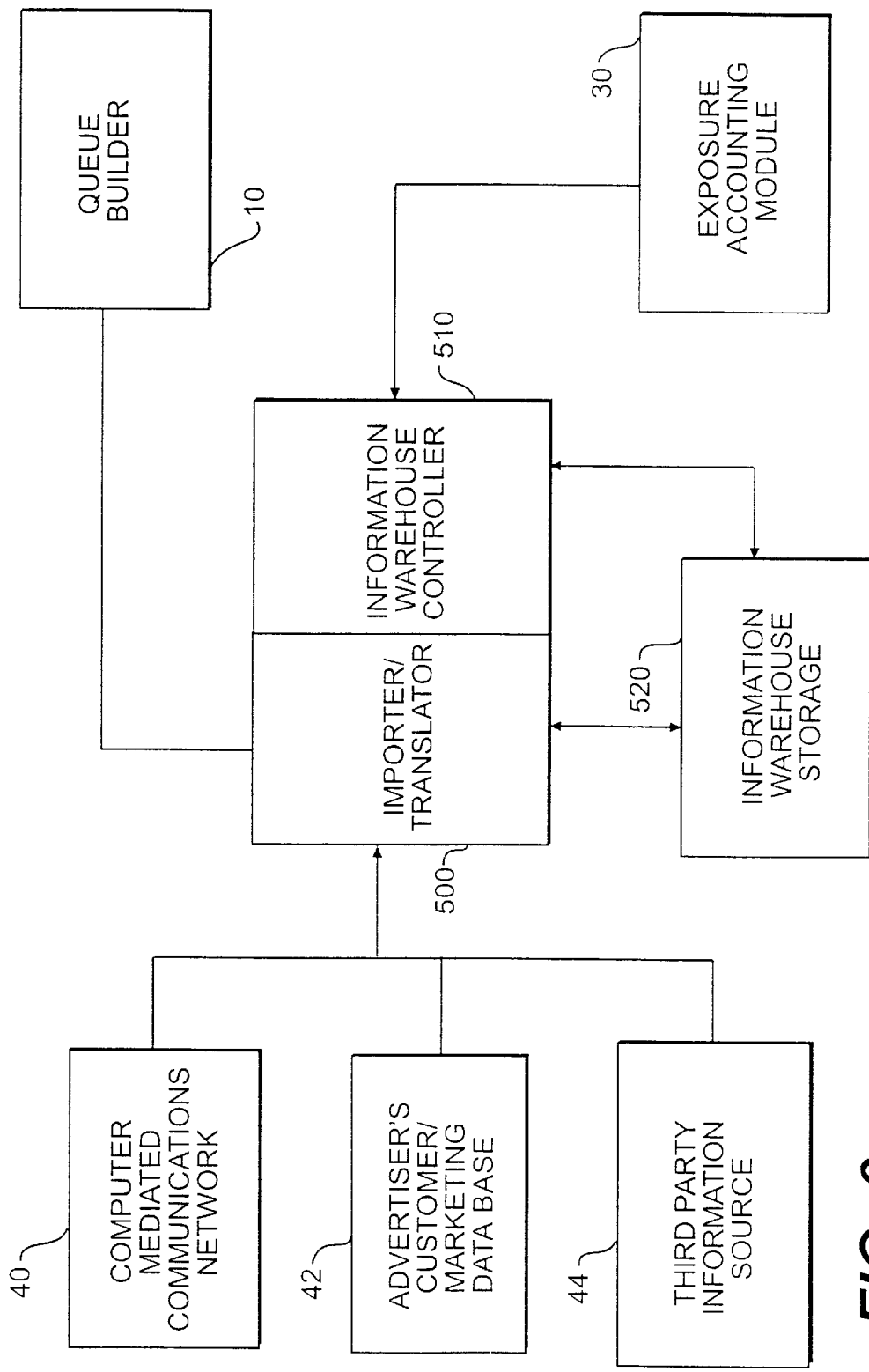
FIG. 3 illustrates an overview of the Information Warehouse Manager of FIG. 1.
Figure 4:
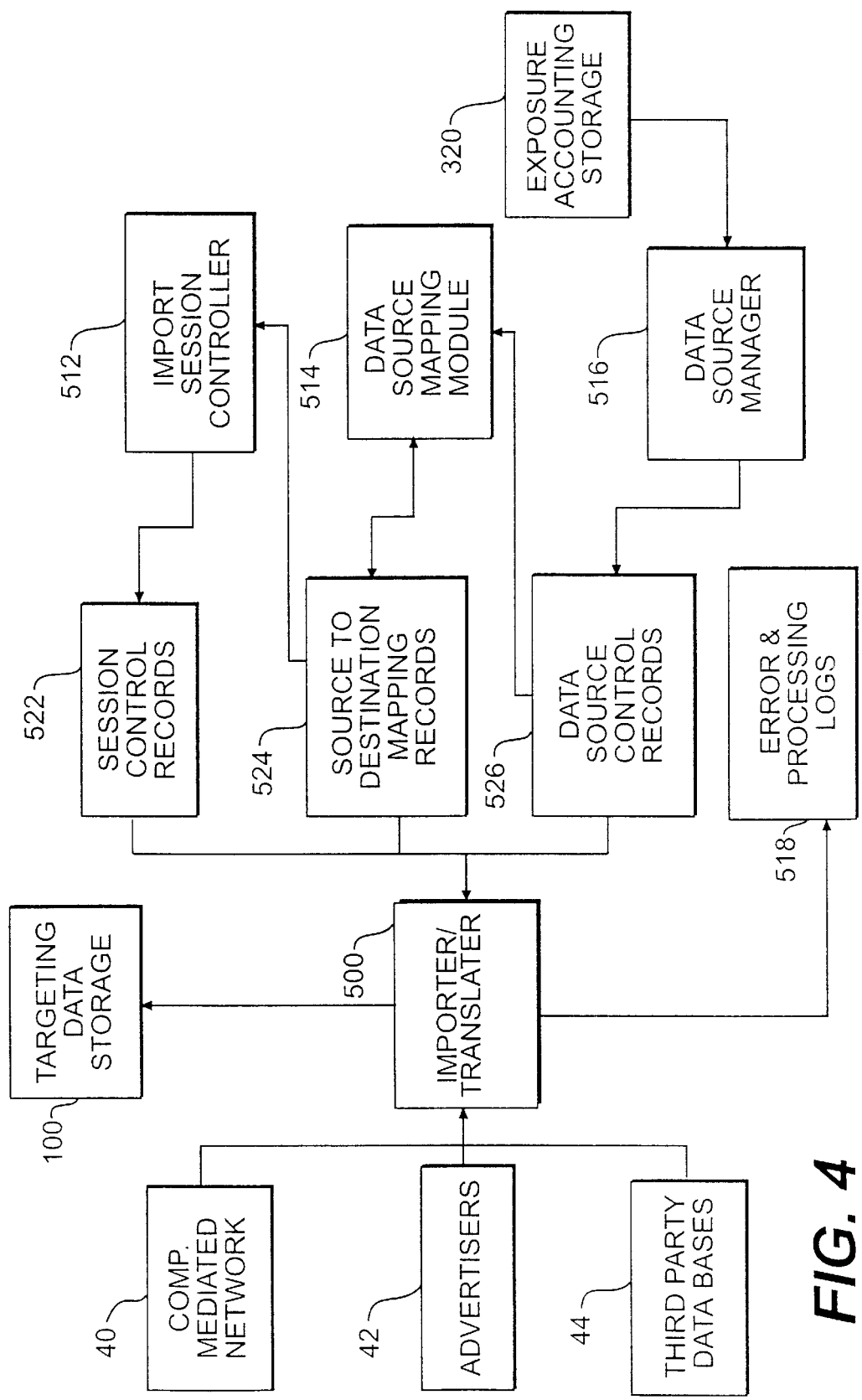
FIG. 4 illustrates a more detailed block diagram of the Information Warehouse Manager of FIG. 3.

An overview of the information warehouse manager 50 is shown in FIG. 3 and a more detailed block diagram is shown in FIG. 4. As shown in FIG. 3, data is loaded into the queue builder 10 from external sources through the information warehouse manager 50. Such external sources include the computer mediated communications network 40, an advertiser's customer/marketing data base 42 and a third party information source 44 (or third party data bases). The information warehouse manager 50 primarily includes an importer/translator 500, an information warehouse controller 510 and an information warehouse storage 520. The information warehouse storage 520 is preferably dedicated to the information warehouse manager 50. The exposure accounting module 30 sends data source control to the information warehouse controller 510.

As shown in FIG. 4, the information warehouse storage 520 includes session control records 522, source to destination mapping records 524 and data source control records 526. The information warehouse controller includes an import session controller 512, a data source mapping module 514 and a data source manager 516. The importer/translator reads this session control, data source control, and source to destination mapping information to determine which external data source (40, 42, 44) data should be imported and translated. As the importer/translator process these external sources, it outputs data to error and processing logs 518 as well as to a targeting data storage 100 of queue builder 10. Data source manager 516 receives data from an exposure accounting storage 320 of the exposure accounting module 30.

In order to load any external data into the queue builder 10 relational data base, physical data source information 526, must be defined in the information warehouse data base 520. When contracts for exposures are entered into the exposure accounting module 30, any external data sources that will be used to build subscriber profiles is identified and captured in the exposure accounting data base. This contract data 32 is passed from the exposure accounting module to the information warehouse manager 100 to ensure that data sources are only used for authorized targeting campaigns. These become data source control records 526. When an external data source is registered with the information warehouse manager 100 it must be related to an existing campaign. Each data source may have multiple physical files (e.g. multiple tapes, diskettes, etc.) New physical files for a data source may be registered through screens provided by the data source manager 516. In a preferred embodiment, to establish a new physical data source the information shown in TABLE 1 should be entered:

TABLE 1 contract id
campaign id
data source master id
data source name
data source originator
data source max. use count
data source valid start date
data source valid end date
physical media identifier
media format In order to load data from an external source into the queue builder 10 data base, the structure and parsing rules for the external source must be defined in a data source mapping module 514. The data source mapping module 514 presents a set of screens that allow the user to enter the files or tables within the physical data source; the format of the source file(s); and whether the source file(s) contain master records for one of the primary targeting entities (i.e. subscribers, content segments, or content locations). Screens also allow each field in an external data source to be identified. Once identified the data source mapping module 514 prompts the user for information necessary to establish a logical mapping of the external data source to data structures of queue builder 10. This information is stored as source to destination mapping records 524. Mapping information collected by the data source mapping module 514 includes information such as that which is shown in TABLE 2.

TABLE 2

| | |
|---|---|
| field translation | any data type conversions, logical value translations, and/or field format translations (e.g. upper/lower case, date format, etc.) |
| business logic filters referential integrity rules mapping criteria | rules for combining or splitting data in source fields to be written to one or more destination fields |
| destination table and field | identification of the destination field(s) for the mapping rule |
| matching rules | how will source records be matched with records of the subscriber, content location, or content segment tables and contracts and campaigns for content segment source records. |
| overwrite/add/append flag | how to handle source data for fields with existing data in the destination table |

An import session controller 512 provides the mechanism to execute, or schedule the execution of, the data import for an external data source. The import session controller 512 validates the authority of the current user to create a session control record 522, and identifies all of the defined data sources to which the user has access. Once the user and the data source(s) security has been verified, a unique import session control number is established. The user must then identify the data source(s), data source file(s), and data source field(s) to use in the import session. The user can also choose to change the default file name and device for the import error and exception report. The user may choose to schedule the import to be done at a later time (or on a regular basis), or to initiate the import session immediately. If this is done, the import session controller 512 stores the schedule information in a session control record 522.

The importer/translator 500 reads the session control records 522 to determine which data sources and mapping records 524 to process. For each active session control record 522, the importer/translator 500 reads all the data sources to be loaded into the targeting data base 100. For each of the data sources to be loaded, the importer/translator 500 retrieves all mapping records 524. As the importer/translator reads the specific data from the source data files, it invoices all translation, mapping and matching rules for that data source. Each source record is processed. If the translation, mapping, and matching rules execute without error, the translated source data is written to the targeting data base 100. All errors are written to the error processing log 518.

The information warehouse manager 50 can be implemented by employing one of several off-the-shelf software products including: Data Junction 5.0 (Tools & Techniques, Inc. Austin Tex., 512-459-1308 800-580-4411); OpenBridge 1.0 (Informatica Corp., Menlo Park, Calif. 415-462-8900 800-653-3871); Extract Tool Suite 2.4 (Evolutionary Technologies Inc., Austin, Tex. 512-327-6994); DDI-Transform (DSLC Technologies Inc., Toronto, Ontario, CANADA 416-620-9995 800-688-7352).

The Queue Builder 10

Figure 5:
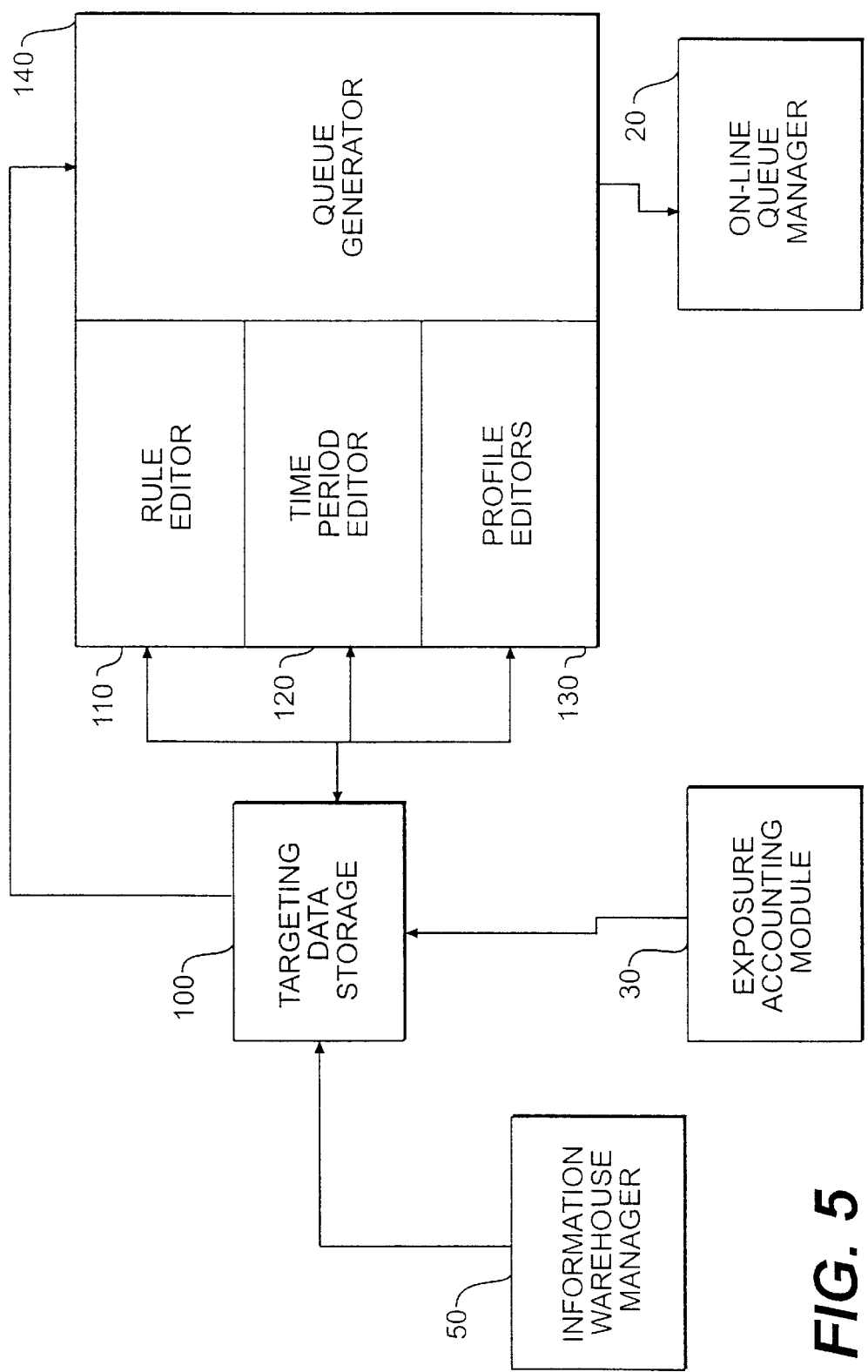
FIG. 5 illustrates an overview of the Queue Builder of FIG. 1.

The queue builder 10 will now be described in more detail in conjunction with FIGS. 5 and 6. FIG. 5 illustrates an overview of queue builder 10 and FIG. 6 illustrates a more detailed block diagram of queue builder 10.

As shown in FIG. 5, the major components of making up queue builder 10 include a targeting data storage 100, a rule editor 110, a time period editor 120, a profile editor 130 and a queue generator 140. The targeting data storage receives data from the information warehouse manager 50 and the exposure accounting module 30, as well as from editors 110, 120 and 130. Data is output from the targeting data storage 100 to the queue generator 140. Queue generator 140 outputs data to the on-line queue manager 20.

Figure 6:
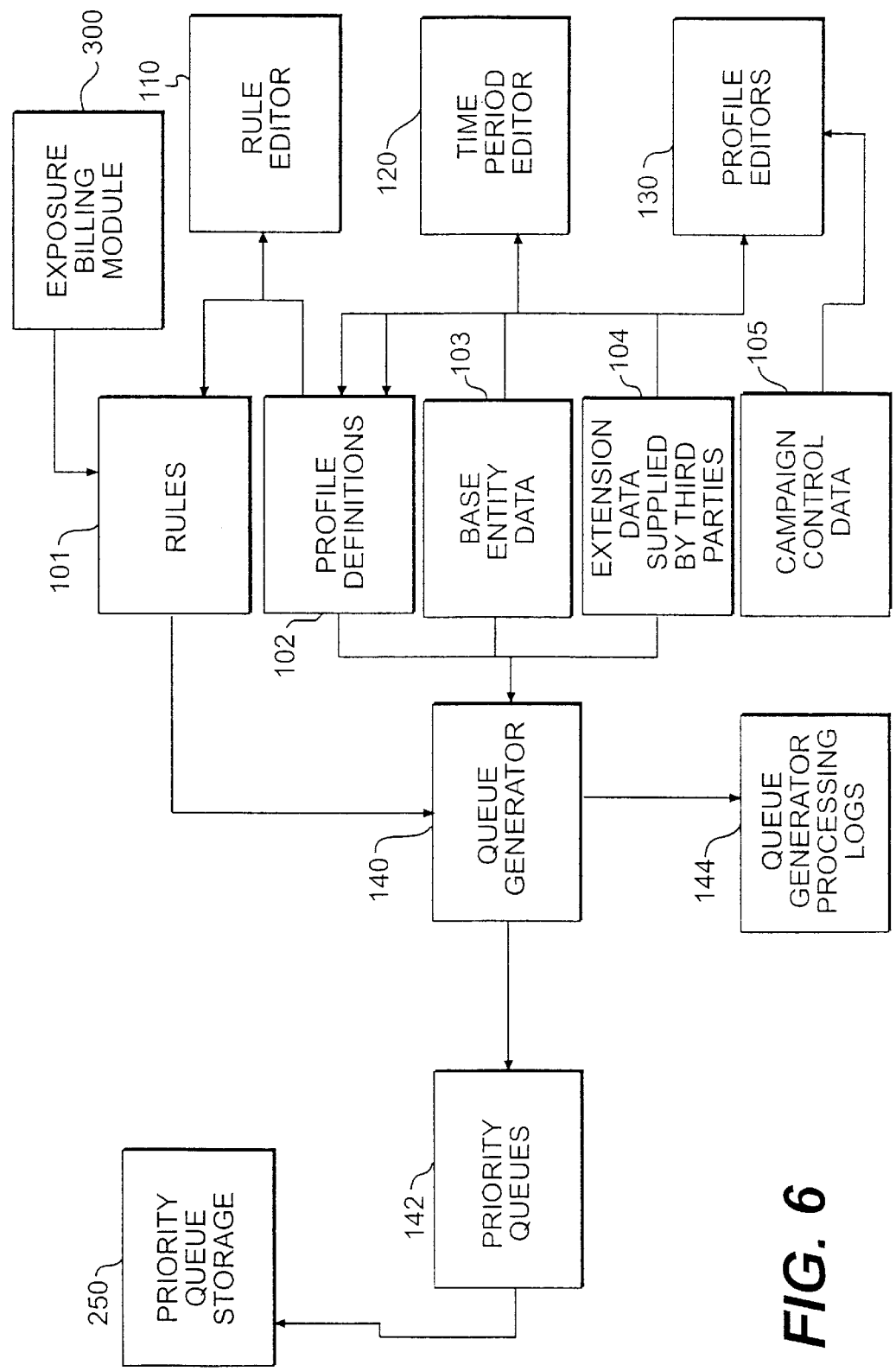
FIG. 6 illustrates a more detailed block diagram of the Queue Builder of FIG. 5.

As shown in FIG. 6, the targeting data storage 100 includes rules 101, profile definitions 102, base entity data 103, extension data supplied by third parties 104 and campaign control data 105. The flow of data within the targeting data storage 100 preferably occurs in the manner shown by arrows in FIG. 6. A more detailed description of the functions carried out is provided below. The rules 101 of the targeting data storage can be updated from the exposure billing module 300 of the exposure accounting module 30.

The queue generator 140 (shown transposed to the left side of the targeting data storage in FIG. 6 as opposed to the right side as if FIG. 5 to improve clarity) is coupled to the targeting data storage 100 as shown and also communicates to queue generator processing logs 144 and outputs priority queues 142. Priority queues are sent to a priority queue storage 250 of the on-line queue manager 20.

The major components of queue builder 10 will now be described in more detail.

Profile Editors 130

Through the profile editors 120 in the queue builder 10, targeting analysts (rule developers) may create definitions for groups of subscribers, content segments, and content locations by building data base selection criteria that will extract all entity records with a common profile. Within a profile editor an analyst can create a folder (implemented as a record in the relational data base) to which other folders and/or profile definitions can be added. This allows analysts to create logical groupings (folders) for each campaign, and sub folders for different components of the campaign. Sub folders can be created by highlighting an existing folder object on the profile editor screen and clicking on a create new folder button screen object. This action initiates a routine in the profile editor that confirms the name of the folder in which the new sub-folder should be created, and prompts the rule developer for the folder name, description, and valid start and end dates. Owner and campaign relationships for the new folder default to those of the parent folder.

For example, an analyst can create a new profile by highlighting an existing folder on screen and clicking on a "Create Profile" on screen button. Depending on the profile editor that is currently on screen (i.e. subscriber profile editor, content location profile editor, or content segment profile editor), this action will initiate a program action that prompts the rule developer for descriptive information for the new profile which includes: profile name, profile description, and valid start and end dates. Profile owner and campaign relationships will default to those of the current folder.

The profile detail is captured by creating a valid selection clause for the current relational data base management system. The program will present to the analyst a visual representation of the data base tables and columns that are available to the current user for building profiles for the current target entity type (i.e. subscriber, content location, content segment). Some tables or columns may not be accessible by the current rule developer because the original data source that populated the column is not available to the campaign or rule developer. The user will click on the columns that are to be used and will input qualifiers (such as greater than, less than equal to, etc.) to construct a valid SQL "WHERE" clause defining the selection criteria for the profile.

When finished constructing the selection criteria, the user can click on an "OK" on screen button to parse and validate the clause, or on a "Cancel" on screen button to abandon the current profile definition. Clicking on "OK" causes the profile editor to parse the current selection criteria to ensure that the syntax and semantics are valid for the relational data base.

If an error is found during the parsing by the profile editor, the program prompts the analyst with a description of the error, and requests the analyst to change the profile data. Once a valid profile is defined the descriptive information and selection criteria are written to the relational data base and a relationship is established to the selected folder.

Both folders and profile definitions can be moved or copied to other folders by dragging and dropping the on-screen profile object. Profile definitions can be modified by double clicking on the desired on-screen profile object. This will cause the profile editor program to present the current descriptive information and selection criteria on the screen and make the information available for editing.

Individual entity records (i.e. individual subscribers, content locations, and content segments) can also be added to folders. An analyst can highlight an existing folder on-screen, and click on an "Add Individual" screen button. Clicking on this button will cause the profile editor program to open a window that displays a list of all records in the primary data table for the current target entity type (the primary data table contains the definition data for each entity type that is available to all users and all campaigns).

The primary data (or base entity definitions) for each type of target entity will be populated with basic identification data used by the host network service, and attributes that are used by the system according the present invention. For subscribers base entity data may include the following listed in TABLE 3.

TABLE 3

| | |
|---|---|
| subscriber id | this is the internal subscriber id used by the present invention |
| network subscriber id | this is the subscriber id (account number, or username, etc.) that will be used by the network application making play list requests |
| subscriber of network | the network to which the individual subscribes |
| The following fields will are not mandatory, and may or may not be available from given networks: | |
| name | a compound field that houses the name of the subscribers |
| mailing address | a compound field that houses the mailing address information for the subscriber (this field and the name fields will be used to "match" external data sources to records in the base entity tables |
| ssn | social security number |
| income | |
| age | |

For content segments, the base entity data will be provided by the advertiser in conjunction with the network service in order to ensure that the segment is identified properly. The base information for content segments may include the following set forth in TABLE 4.

TABLE 4

| | |
|---|---|
| segment id | identification number for the segment used within the present invention |
| segment handle | this is the identification information required by the network service to properly identify, retrieve, and transmit the content segment to the subscriber |
| segment name | name used internally to identify the content segment |
| segment description | brief description of the material contained in the content segment file |
| segment media type | is the media type (e.g. gif file, video stream, text file, application, etc.) of the segments to be returned to the requesting application in the form "general type/specific format" (i.e. image/gif) similar to MIME types. |
| segment use type | specifies how the content segment should be used within an application. Again specified in the form "general/specific" (e.g. advertisement/30 second, newsstory/intro., etc.) |

Content location base identification data will be provided by the network service. This data will identify an describe the location switch in an on-line application where content segments can be targeted. The identification information may include the following shown in TABLE 5.

TABLE 5

| | |
|---|---|
| location id | identification number for the location used within the invention |
| location handle | this is the identification information required by the network service to identify where a play list request is being made |
| location name | name used internally to identify the content location |
| location description | brief description of the content location. This field may link the base entity record to addition descriptive data that provide genre-type descriptive data. |

The user can manually select one or more of the records displayed in this window. Once the individual records are highlighted, the analyst can drag and drop them into folders showing in the profile editor window. This on-screen action causes records to be written to the relational data base that create a link between the folder and the individual records "dropped" into that folder. Unlike profiles, data within an individual targeted entity record can not be modified from the profile editors 130. Analysts can view the data contained in the individual records within folders by double clicking on the screen representation. This action will cause the profile editor program to open an on-screen window that displays (but prevents updates to) the data related to the selected individual entity record.

Alternative Sequence Building Functionality

In an enhanced implementation of the present invention, the queue builder 10 and on-line queue manager 20 provide advertisers and other programmers of content segments to create segment sequence definitions that ensure that multiple segments are shown in a specific sequence to a specific subscriber. Programmers can also define the approximate amount of time between segments in the sequence. In order to accomplish this function, the profile editor for content segments is enhanced with the capability to define a sequence of multiple content segments. Within the content segment profile editor, a rule developer can define a sequence of segments by selecting the first segment in the sequence and clicking on the "Create Sequence" on-screen button. This action creates a sequence master record that contains the identified segment id (which will be the initial segment in the sequence), a unique sequence id, opens a window that allows the rule developer to create sequence records with the fields shown in TABLE 6:

TABLE 6

| | |
|---|---|
| sequence id | unique id for entire sequence generated by the profile editor |
| sequence number | id of current item in sequence (segments in a sequence are shown in ascending order of sequence numbers) |
| segment id | |
| inherit priority flag | 1 = priority inherited for any rule using this sequence, 2 = priority for segment set to 100 |
| exposure delay | number of minutes after subscriber is exposed to previous segment that current segment is to be available to the on-line queue manager 20 to be included in a content segment play list 21 |
| segment media type | inherited from the media type in the segment description table |
| segment use type | inherited from the use type in the segment description table |

Once defined sequences can be place in the segment slot in the rule editor 130 in the same manner as an individual content segment, a segment profile, or a folder of segments.

Time Period Editor 120

The programming engine provides a mechanism to create time period definitions through the time period editor 120. These time period definitions can be the targets for content segments in the same way as subscribers and content locations. The time period editor 120 uses the same folder management mechanism used in the profile editors 130. The program retrieves all existing folders for the current user and the current campaign(s) to which the user has access. Time period definition records are stored in the data base and related to folder records. New time period definitions can be created by clicking on a "Create New TP" on-screen button. The user is prompted to enter the time period definition descriptive data (i.e. name, description, and valid start and end dates). Once this data is entered, the definition editor allows a analyst to select the minor and major units of granularity for the time period definition (hour(s) of a day, day of week, day of month, week of month, month of year). Once the granularity is selected the program presents a visual representation of the minor time units within the major units (i.e. day with hours marked, week with days marked, etc.) starting with a presentation that contains the valid start date from the time period definition record. In this visual presentation an analyst can highlight one or more of the increments (i.e. hours, days, weeks, or months) shown. The program displays a "Recurring" button when the initial unit (the unit containing the valid start date for the time period definition) is displayed on the screen. When the "Recurring" button is pressed, the program prompts the user for the recurring frequency (i.e. every day, every week day, every same day of week, same day of month, etc.). To complete the definition of a recurring time period the user is prompted to enter the end date of the recurrences (the program defaults to the valid end date for the time period definition record). When the analyst has completed entering the definition for the time period, data records are written to the relational data base that identify the increments, the units, and the recurrence pattern defined.

With the subscriber, content location, content segment folders and profiles, and the time period definitions; rule developers have all of the data necessary to develop targeting rules that identify target objects (i.e. individual records, profiles, or folders of content locations, subscribers, and time periods) and the content segments (individual records, profiles of segments, or folders) with which they will be targeted.

Rule Editor 110

The rule editor 110 provides the mechanism for an analyst to establish the priority with which a specific content segment (or profile of segments) is targeted to a specific target entity (subscribers, content locations, or time periods), or profile of target entities. Rules that maintain the relationship between target entities and content segments are held as records in the relational data base. The records preferably maintain the following information listed in TABLE 7.

TABLE 7

| | |
|---|---|
| rule_id | unique identifier |
| target entity type | Subscriber, Location, or Time Period |
| target object type | base entity record, profile record, or folder |
| target object id | unique identifier from the target object table |
| priority | integer between 0 and 100 |
| target segment type | base entity record, profile record, or folder |
| target segment id | unique identifier from the target segment table |
| campaign id | id of the campaign from the contracts data base for which this rule was developed |
| max. frequency | |
| max. repeat | |
| valid start date | |
| valid end date | |

When invoked, the rule editor 110 presents the targeting analyst with a list of the current folders and rules that are available based on the analyst's security privileges. The analyst can select one of the folders or rules to be modified, or can create a new rule. When creating a new rule, the rule editor 130 prompts the analyst for the campaign that the new rule will support. The rule developer can select a campaign from the list of contracts and campaigns to which the rule developer has access. Once the campaign has been selected, the user is prompted for a target entity type for the new rule.

Once an entity type is selected the rule editor 130 presents two windows of folders. The first window (the target object window) is a listing of all folders containing the target entities of the type selected. The second window presents all of the folders for the content segments that are related to the campaigns available to the current user. Within each of these windows the analyst can double click on a folder to view the contents (i.e. sub folders, profiles, or individual target entity records) of these folders. The analyst can create a rule by dragging and dropping an item from the target object window (a folder, a profile, or an individual entity record) into the target object slot in the rule construction window. The analyst can likewise select a content segment folder, profile, or record and drop it into the content segment slot in the rule construction window.

When the target object and content segment fields are filled, the rule editor 110 prompts the user for a priority to use to link the target object with the content segment; for all of the frequency control data (max. frequency, and max. repeat); and for the valid start and end dates (defaults are taken from the current campaign). Once this data has been entered and validated by the rule editor 110 a rule record is written to the relational data base; and is available to the queue generator 140 for use during the next queue generator run.

Queue Generator 140

The queue generator 140 creates the prioritized segment queues (priority queues 142) that are exported to the on-line queue manager 20. Queues are created for each of the target entity types (i.e. Subscribers, Content Locations, and Time Periods) based on the rules stored in the relational data base.

Queues are created in the following manner. The queue generator 140 selects all currently valid rules by selecting all rule records that have a valid start date prior to the current date, and a valid end date later than the current date. These records are stored temporarily in a processing stack that is read by the queue generator 140. If the stack is empty the queue generator 140 prints a queue generator 140 summary report indicating that no valid rules were found. If the stack has rules in it, then the queue generator 140 processes each rule. For each rule in the stack, the queue generator 140 evaluates the target object type. The target object types include folders, profiles and individual entities.

The queue generator 140 creates a list of the individual target entities identified in the rule. In the case where a rule contains a target object that is a folder, the queue generator 140 searches the relational data base for all profiles and individual records identified as contents of the folder. For each profile the queue generator 140 searches the relational data base for all individuals that match the profile selection criteria. The generator maintains a current rule target list which holds the record ids for each individual record that is related to the folder or identified by profiles in the target object slot of the rule record currently being processed. Where individual records are included in multiple profiles only a single record is written to the current rule target list. In the event that the rule's target object is a profile, the queue generator 140 creates the current rule target list by searching the relational data base for all records that satisfy the profile's selection criteria. The current rule target list represents the target population for the rule.

The queue generator 140 next builds a list of current rule segments by selecting from the relational data base all segments identified by the target segment type, and target segment id. Since target segment types include folders, profiles, and individual content segments; the on-line queue manager 20 must evaluate the target segment type. If the target segment type is a folder, then the on-line queue manager 20 must select from the relational data base all individual content segment records related to the folder, and all individual content segments identified by the profiles within the folder. If the target segment type is a profile the queue generator 140 retrieves from the relational data base all content segment records that satisfy the selection criteria contained in the profile record. The resulting collection of individual content segment records is written to the current rule segment list. If a single content segment is identified several times within a target object (i.e. a content segment is included in multiple profiles in a single folder), then the content segment is written only once to the current rule segment list.

For each pair of target entity records (in the current rule target list) and segment ids (in the current rule segment list), the queue generator 140 will write a record to the appropriate queue (i.e. the subscriber queue if the target entity type for the current rule is "subscribers", the location queue if the target entity type is "location", or the time period queue if the target entity type is "time period"). The record may contain the following information listed in TABLE 8.

TABLE 8

| | |
|---|---|
| target id | id for the target entity |
| segment id | id for the content segment |
| priority | the priority of the current rule |
| rule id | id of current rule (for audit and accounting) |
| segment media type | |
| segment use type | |
| next exposure | |
| max. frequency | number of minutes between exposures to the subscriber |
| max. repeat | |

If a record already exists for the given target id and segment id combination, the queue generator 140 examines the priority. If the priority in the queue record is greater than or equal to the priority of the rule currently being processed (or the priority is 0 indicating that the individual entity should never be exposed to the segment), then the queue generator 140 does nothing. If the priority of the existing queue record is less than the priority of the rule currently being processed (or the current rule priority is 0), then the queue generator 140 updates the record with the current priority, and updates the rule id with the current rule id.

The queue generator 140 also writes a record to the queue generator processing logs 144 in the relational data base indicating the conflict between the two rules. The output of the queue generator 140 includes three queue tables in the relational data base (i.e. subscriber queues, content location queues, and time period queues), and a rule conflict table. The priority queues are loaded onto the on-line queue manager 20 platform by the system administrator, or through a scheduled routine. If the sequence capability is implemented, a table of sequence definitions is also loaded onto the on-line queue manager 20.

The On-Line Queue Manager 20

Figure 7:
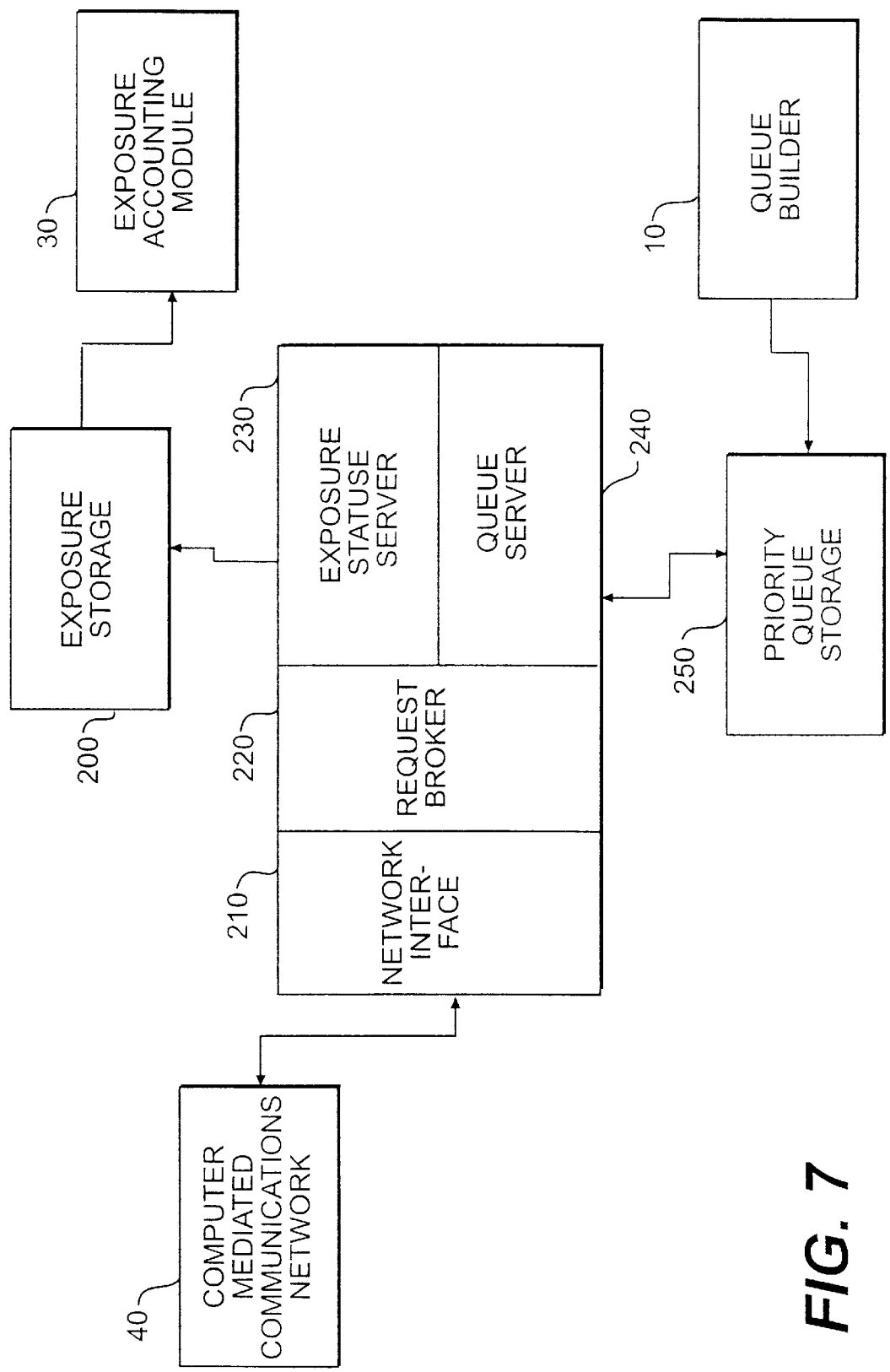
FIG. 7 illustrates an overview of the On-Line Queue Manager of FIG. 1.

The on-line queue manager will now be described in conjunction with FIGS. 7 and 8. FIG. 7 illustrates an overview of the on-line queue manager 20 according to the present invention, while FIG. 8 illustrates a more detailed block diagram of the on-line queue manager 20.

As shown in FIG. 7, on-line queue manager 20 includes an exposure storage 200, a network interface 210, a request broker 220, an exposure status server 230, a queue server 240 and a priority queue storage 250. The exposure storage 200 is also read by the exposure accounting module 30. As described earlier, priority queue storage 250 receives priority queues from queue builder 10. Network interface 210 exchanges data with the computer mediated communications network 40.

Figure 8:
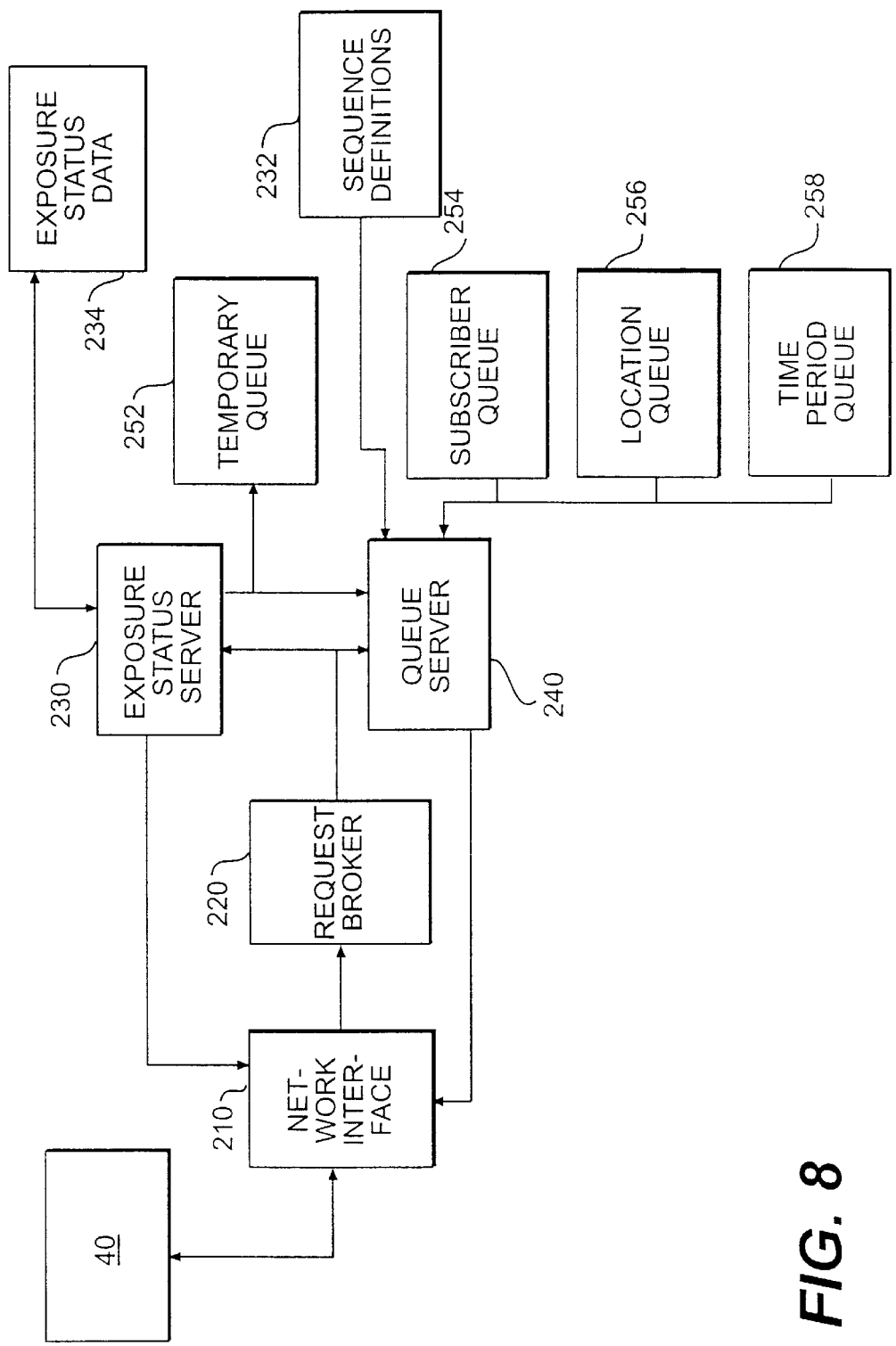
FIG. 8 illustrates a more detailed block diagram of the On-Line Queue Manager of FIG. 7.

In FIG. 8, the interconnections between the major components of the on-line queue manager 20 are shown in more detail. Furthermore, the priority queue storage 250 is shown to include a temporary queue 252, a subscriber queue 254, a location queue 256, a time period queue 258 and sequences definitions 232. The exposure status server 130 receives sequence definitions 232 and exchanges data with an exposure status data module 234. The functional parameters of the on-line queue manager will be described below in more detail along with descriptions of individual components.

The priority queues and sequence tables are loaded into the on-line queue manager 20, from the queue builder 10, through standard snapshot or data base load routines in the relational data base management system. Requests for content segment play lists come from the applications running within the computer mediated communications network 40.

Network Interface 210

Requests for content segment play lists are first received by a network interface 210, which is the software and hardware connection to the on-line service. This component of the on-line queue manager 20 will change depending on the network topology and protocol being run on the computer mediated communications network 40 being served by the on-line queue manager 20. The network interface 210 listens for calls coming from client applications. When the request arrives the network message is processed and translated into the messaging protocol used internally within the on-line queue manager 20. Once messages are converted to the standard internal protocol they are passed to the request broker 220.

The network interface 210 also processes the reply messages from the on-line queue manager 20 to the calling application on the network 40. Messages to be sent to client applications are received from a queue server 240 and an exposure status server 230. These messages are translated from the On-Line Queue Manager internal messaging protocol into the protocol used by the client application, and are returned through the network system to the client application.

Request Broker 220

The request broker 220 assigns a unique request identification field to each request. Each request is evaluated to determine if it is for the queue server 240 or the exposure status server 230 by looking at the request name. Because multiple instances of the queue server 240 and the exposure status server 230 may be running at any given time, the request broker 220 will determine which instance of each service is least busy and pass the incoming request to this server instance. The request broker 220 will also maintain logs of the number, types, and the server instance handling each request.

Queue Server 240

The queue server 240 responds to requests from network applications. A response takes the form of a play list of content segment ids. Request messages to the queue server 240 may take the form set forth below in TABLE 9.

TABLE 9

| | |
|---|---|
| ipeGetPlayList (inSessionID, forSubscriberID, atLocationID, atCurrentTime, ofMediaType, forUseType, [ofNSegments]) | |
| Where | |
| inSessionID | is the session identifier for the current subscriber session on the calling application |
| forSubscriberID | is a valid subscriber id of the subscriber using the on-line service calling the on-line queue manger |
| atLocationID | is a valid location id for the application location from which the request was made |
| atCurrentTime | is the date and time that the request is being made |

TABLE 9-continued

| | |
|---|---|
| ofMediaType | is the media type (e.g. gif file, video stream, text file, application, etc.) of the segments to be returned to the requesting application |
| forUseType | is the use type (e.g. advertisement, news story, movie, etc.) of the segments to be returned to the requesting application |
| ofNSegments | is the number of segments to return to the calling program (this parameter is optional, if omitted, a single segment id will be returned in the response play list 21) |

The on-line queue manager 20 issues a query to the relational data base engine to retrieve all records from the subscriber queue table 254 and the temporary queue table 252 where the target id matches the forSubscriberID, and where the segment id identifies a segment of the correct ofMediaType and the correct forUseType. Separate queries are issued to retrieve all records from the locations queues 256 and the time period queues 258 where the segments are of the correct ofMediaType and forUseType. The result is a priority list of content segments for the subscriber, location, and time period identified in the request. The content segment play list is constructed by combining the lists generated by the three priority queue queries. While combining the query results the queue server 240 must determine the priority of content segments that appear in more than one of the query result tables (e.g. the segment appears in the target queue for both the subscriber and the location with different priorities). If a content segment appears in any of the three result tables with a priority of 0 (zero) (indicating that the subscriber has canceled future exposures to this segment), then that segment is removed from all of the result tables regardless of priority. For other content segments that appear in multiple result tables, the queue server 240 will be configured to calculate the priority for that content segment by either 1) taking the maximum priority, 2) adding the priorities, or 3) multiplying the priorities. The result is a single list of prioritized content segments that satisfy the request.

Before sending the response, the queue server 240 must ensure that no frequency control constraints are violated. There are several methods for implementing the frequency control mechanism of the on-line queue manager 20.

Method 1: According to one method, the queue 240 would maintain and examine a repeat queue (not shown). This queue would be a table of segment-target pairs that must be repeated. If there are any records in the repeat queue for the current subscriber or location, these segments would be placed in the play list first and the repeat count value in the appropriate record of the repeat queue would be incremented.

To ensure that max. frequency constraints are not violated, the queue server 240 maintains a next exposure field for each record in the priority queues. Once a content segment is placed into a play list the next exposure field in the record relating the current subscriber to the content segment is updated with a value equal to the current date and time plus the number of minutes in the max. frequency field. When the priority lists are created by the queue server 240, records in the priority queues are not retrieved if the next exposure field value is greater than the atCurrentTime value.

Method 2: A second method of controlling time-based frequency and repeat constraint provides additional functionality that will also allow segments to be sequenced. In this method the queue server 240 maintains a temporary priority queue with the following attributes listed in TABLE 10.

TABLE 10

| | |
|---|---|
| target id | id for the target entity |
| segment id | id for the content segment |
| priority | the priority of the current rule |
| rule id | id of current rule (for audit and accounting) |
| segment media type | |
| segment use type | |
| next exposure | |
| max. frequency | number of minutes between exposures to the subscriber |
| max. repeat | |

This queue is constructed at run time by the queue server 240, and is used for determining play lists in the same manner as the other priority queues (for subscribers, locations, and time periods). In order to guarantee repeats and to ensure that max. frequency constraints are not violated, the queue server 240 would perform the following steps:

1) a content segment is read from a target object queue (which could be the subscribers, locations, time periods, or temporary queues table) and placed in a play list, 2) if the current record in the target object queue has a value of greater than 0 in the max. repeat field, then the queue server 240 would write a new entry to the table of temporary queues. The rule id, target id, segment id, segment media type, segment use type, and max. frequency are copied from the current object queue record into the new temporary queue record. In order to ensure that the segment is repeated the priority is set to 100, and the next exposure value is set to the current date and time. The value of the max. repeat field is set to one less that the value in the original target object queue record.

3) if the current record in the target object queue has a value of 0 in the max. repeat field, then the queue server 240 would write a new entry to a table of temporary queues (the temporary queue). The rule id, target id, segment id, segment media type, segment use type, and max. frequency are copied from the original target object queue record into the new temporary queue record. In order to ensure that the segment is not repeated and that the max. frequency constraint is not violated the priority value of the new record is set to 0. The value in the next exposure field is set to the current date and time plus the minutes in the max. frequency field.

4) if the content segment placed in the play list was taken from a record in the temporary queue, then the original record is deleted.

5) in the final step, after sending the play list to the network interface 210, the queue server 240 would delete all records from the temporary queue where the date-time value of the next exposure field is prior to the current date and time and the priority value is 0. These records were written to the queue to ensure (through a priority of 0) that the segment is not exposed to the identified target prior to the next exposure date and time. Deleting these records makes the content segments available to be exposed to the target entity through records that exist in the subscriber, location, or time period queues.

Another use of the temporary queue maintained by the queue server 240 is to provide a control mechanism that allows content segments to be shown in a specific sequence. This method of implementation of the on-line queue manager 20 requires implementation of additional functionality in the queue builder 10 discussed earlier in the section entitled "Alternative Sequence Building Functionality". When sequencing is implemented in the invention the following steps are added to the queue server 240 process described in Method 2 above between steps 1 and 2:

a) search the sequence to determine if the segment just inserted in the play list is the initial segment in a sequence. If not, skip the rest of the steps.

b) determine the sequence id c) copy all records from the sequence items table to the temporary queue table inserting the current target entity type, and target entity id.

d) for each of these new records in the temporary queue table set the priority to that of the priority in the original target object queue record, or to 100 depending on the value of the inherit priority flag in the sequence record.

e) for the first sequence item in the temporary queue table set the value of the next exposure field to the current date and time plus the value in the exposure delay field of the sequence item record f) for each subsequent sequence item set the next exposure field to the value of the next exposure field of the previous item plus the value in the exposure delay field in the sequence table.

g) for each new record in the temporary queue set the max. repeat value to 0.

After building the play list for the response to the client application, the on-line queue manager 20 generates a unique exposure id to attach to each segment in the play list. Once the queue list is of the proper length (as specified by the ofNSegments parameter), the play list is returned to the network interface 210, which translates the message and addresses it correctly to the calling application. The queue server 240 also sends the play list with a ipeExposureCreate request to the exposure status server.

Exposure Status Server 230

The exposure status server 230 provides a mechanism for additional data to be captured and maintained about the exposures represented by the items returned in a content segment play list. Once a play list is returned to an on-line application, the programming system no longer has control over what happens. The on-line application could hold the content segments in a cache to show to a user at a later time, or the application may choose not to show the segment at all. In addition, a subscriber's actions when shown the content segment are not tracked directly by the programming system.

How long a subscriber was exposed to a segment, whether the subscribers interacted with the content segment, or whether the subscriber chose to cancel the segment are all pieces of information that the on-line application is aware of and the programming system is not. In order to provide an opportunity for this information to be accessed by the targeting data storage 100 and the exposure accounting module 30, the exposure status server 230 is implemented to handle requests from on-line applications that maintain or update status information about specific content segment exposures once they have been returned from the queue server 240.

The exposure status server responds to three types of requests: ipeExposureCreate, ipeExposureUpdate, ipeContentCancel. The exposure creation request comes from the queue server 240 only. This request is used to establish an exposure record for each content segment in play lists that are created by the queue server 240. The request may take the form set forth in TABLE 11.

TABLE 11 ipeExposureCreate (withExposureId, forSubscriberID, atLocationID, atTime, forSegmentID, fromRuleID, withPriority)

| Where | |
|---|---|
| withExposureId | is the unique exposure id assigned to the individual content segment included in the play list |
| forSubscriberID | is a valid subscriber id of the subscriber exposed to the segment |
| atLocationID | is a valid location id for the application location from which the original play list request was made, this assumes that this location is where the on-line application will actually make the exposure |
| atTime | is the date and time that the play list was returned to the calling on-line application |
| forSegmentID | is the content segment id of an individual item returned in a play list |
| fromRuleID | is the rule id of the from the priority queue that "pushed" the content segment into the play list based on the queue server 240 prioritization algorithms |
| withPriority | is the priority that was computed for the content segment to "push" it into the play list |

Upon receiving an exposure create request, the exposure status server 230 writes a record for the new exposure to the exposure storage 200. Records in the exposure storage 200 contain the following information: exposure id, subscriber id, location id, datetime stamp, rule id, exposure status, segment entry time, segment exit time, subscriber cancel flag. When exposures are first written to the exposure storage 200, the exposure status value is set to "exposed". This status means that the content segment was returned in a play list to the application. An alternative implementation of the invention would place the create exposure functionality within the queue server 240.

Once exposures exist within the data base, the exposure status server maintains various fields in the data base depending on requests sent from the on-line service application. Exposure status requests may take the form set forth in TABLE 12.

TABLE 12 ipeExposureUpdate (ExposureId, NewStatus, [SegmentEntryTime,] [SegmentExitTime])

| Where | |
|---|---|
| withExposureId | is the unique exposure id assigned to the individual content segment included in the play list |
| NewStatus | is the new status of the exposure |
| SegmentEntryTime | is an optional parameter that can be used by on-line applications to mark when the segment was first exposed, or the application represented by the segment was entered |
| SegmentExitTime | is an optional parameter that can be used to mark when the subscriber left an exposure or exited an application |

Upon receiving an exposure update request, the exposure status server modifies existing records in the data base with values contained in the parameters of the request. Valid values for the NewStatus parameter include those set forth in TABLE 13.

TABLE 13

| | |
|---|---|
| exposed | default value used when the exposure is created, signifying that the segment was returned in a play list |
| held | on-line applications can hold segments prior to presenting them to end subscribers, because of this delay subscribers may log off before ever really being exposed to a subscriber. |
| viewed | signifies that the segment was, in fact, shown to the targeted subscriber. (entry and exit times are used when the status is set to viewed) |
| entered | may be used when the segment id represents an active element within the on-line application that can launch another application, or stream of data (audio or video). |
| errNNNN | an error occurred when the application attempted to display the segment to the subscriber. NNNN will be replaced with the error number. Typical errors may be "segment not found," "segment id invalid," "playback error" and others. |

The segment entry and exit times may be used when the exposure status is viewed or entered. These times will mark how long the subscriber was exposed to the content, or how long the subscriber spent in a content application. The final request type handled by the exposure status server is a cancellation request. This function has been added to ensure that an application can be created by the on-line service or an advertiser that allows subscribers to cancel any future exposures to a specific piece of content, or to all targeted exposures generated by the same rule. This request may take the form set forth in TABLE 14.

TABLE 14

| | |
|---|---|
| ipeContentcancel (ExposureId, CancelFlag) | |
| Where | |
| ExposureId | is the unique exposure id assigned to the individual content segment included in the play list |
| CancelFlag | is set to a value to cancel either the specific piece of content related to the exposure, all content related to the rule that generated the exposure, or all targeted content presentation |

In response to this request the exposure status server updates the corresponding record in the exposure data base. The exposure status server locates the exposure record identified by the ExposureId parameter. The subscriber cancel flag field is set to the value of the CancelFlag parameter of the request. This record becomes the current exposure record. In order the ensure that the cancellation request takes effect immediately, the exposure status server also creates new record(s) in the temporary queue that is accessed by the queue server 240. If the cancel flag is set to "exposure", a single item is placed in the temporary queue. The values placed in the temporary queue record may be those listed in TABLE 15.

TABLE 15

| | |
|---|---|
| target entity type | Subscriber |
| target id | subscriber id identified in current exposure record |
| segment id | segment id identified in current exposure record |
| priority | 0 -- to ensure that the segment is not shown again |
| rule id | "subscriber cancel" |
| segment media type | exposure status server locates record in subscriber queue where subscriber and segment are same as current exposure record, and copies segment media type value |
| segment use type | copied from selected subscriber queue record |
| next exposure | set to a value greater than the date and time of the next queue import from the queue builder |
| max. frequency | blank |
| max. repeat | set to −1 indicating that the segment should not be repeated and the record should not be deleted from the temporary queue. |

If the value of the cancel flag parameter is "associated", the exposure status server will write multiple records to the temporary queue. Each temporary queue record will be for the current subscriber. However, each record will be for a different content segment. The appropriate content segments will be determined by the exposure status server in the following manner. The exposure status server will locate the record in the priority queue where the subscriber id and the segment id of the current exposure record are equal to the subscriber id and segment id in the subscriber queue record. From this record the exposure status server will take the rule id as the current rule. The exposure status server will then select all records from the subscriber queue where the subscriber is the current subscriber, and the rule id is the current rule. For each unique value of segment id in the answer set the exposure status server will write a record to the temporary queue with a priority of 0 (similar to the record shown above).

The Exposure Accounting Module 30

Figure 9:
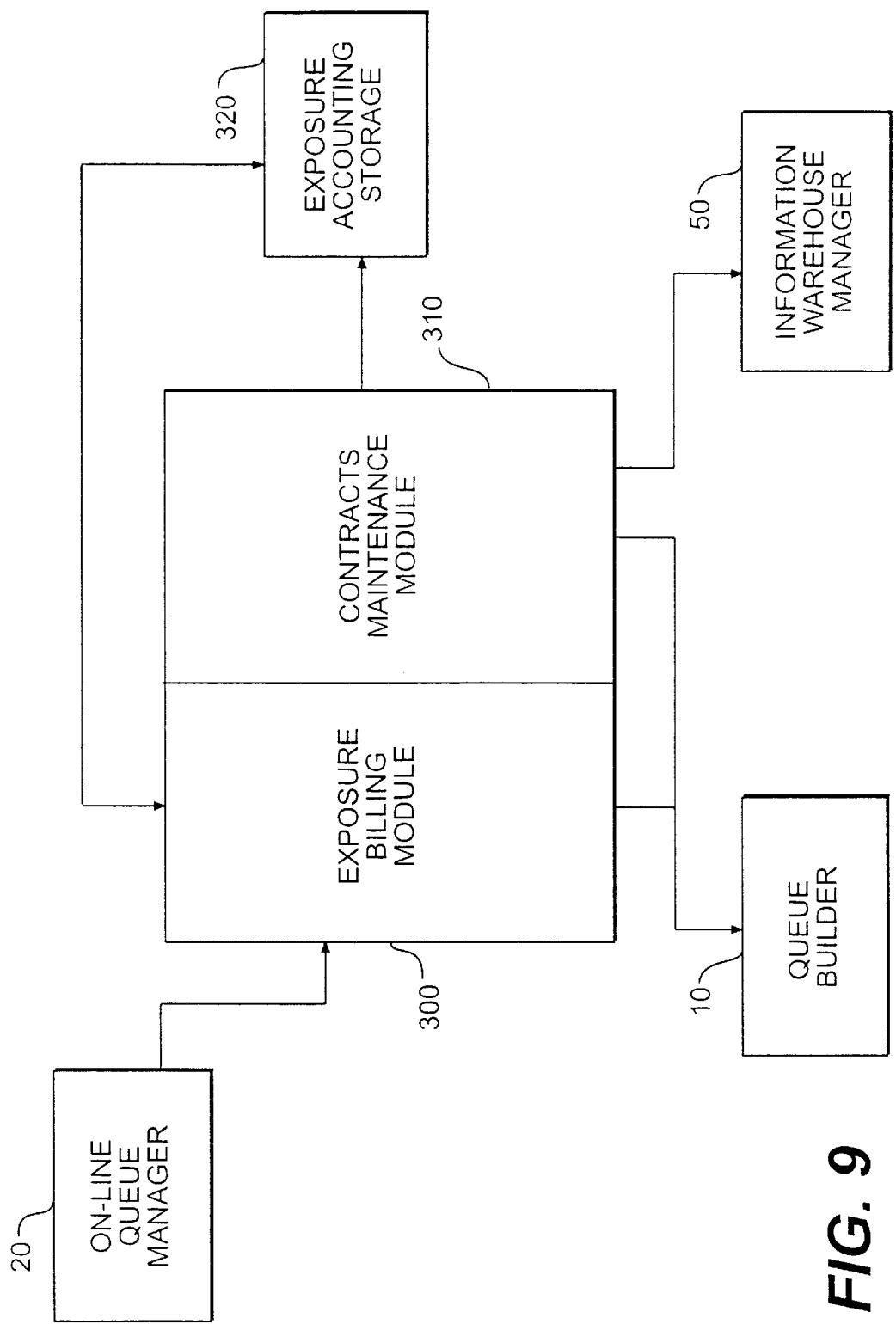
FIG. 9 illustrates an overview of the Exposure Accounting Module of FIG. 1.

The exposure accounting module 30 will now be described in more detail in connection with FIGS. 9 and 11. As shown in the overview FIG. 9, the exposure accounting module 30 resides on a accounting system platform and is implemented in two software components: a contracts maintenance module 310, and an exposure billing module 300. The exposure billing module 300 receives exposure data from the on-line queue manager 20 and stores this information in an exposure accounting storage 320. Both the exposure billing module 300 and the contracts maintenance module 310 output data to the queue builder 10. Furthermore, the contracts maintenance module 310 outputs contract, descriptive and pricing data to the exposure accounting storage 320 as well as contract data and source control data to the information warehouse manager 50.

The contracts maintenance module 310 establishes and maintains all information about the business relationship between the entity that wants to target content (content owner, or advertiser), and the entity that provides the environment where targeting can take place (service provider, site host, or network providers). In order to access the rest of the system according to the present invention, account and campaign information must be entered into the exposure accounting module 30.

Figure 11:
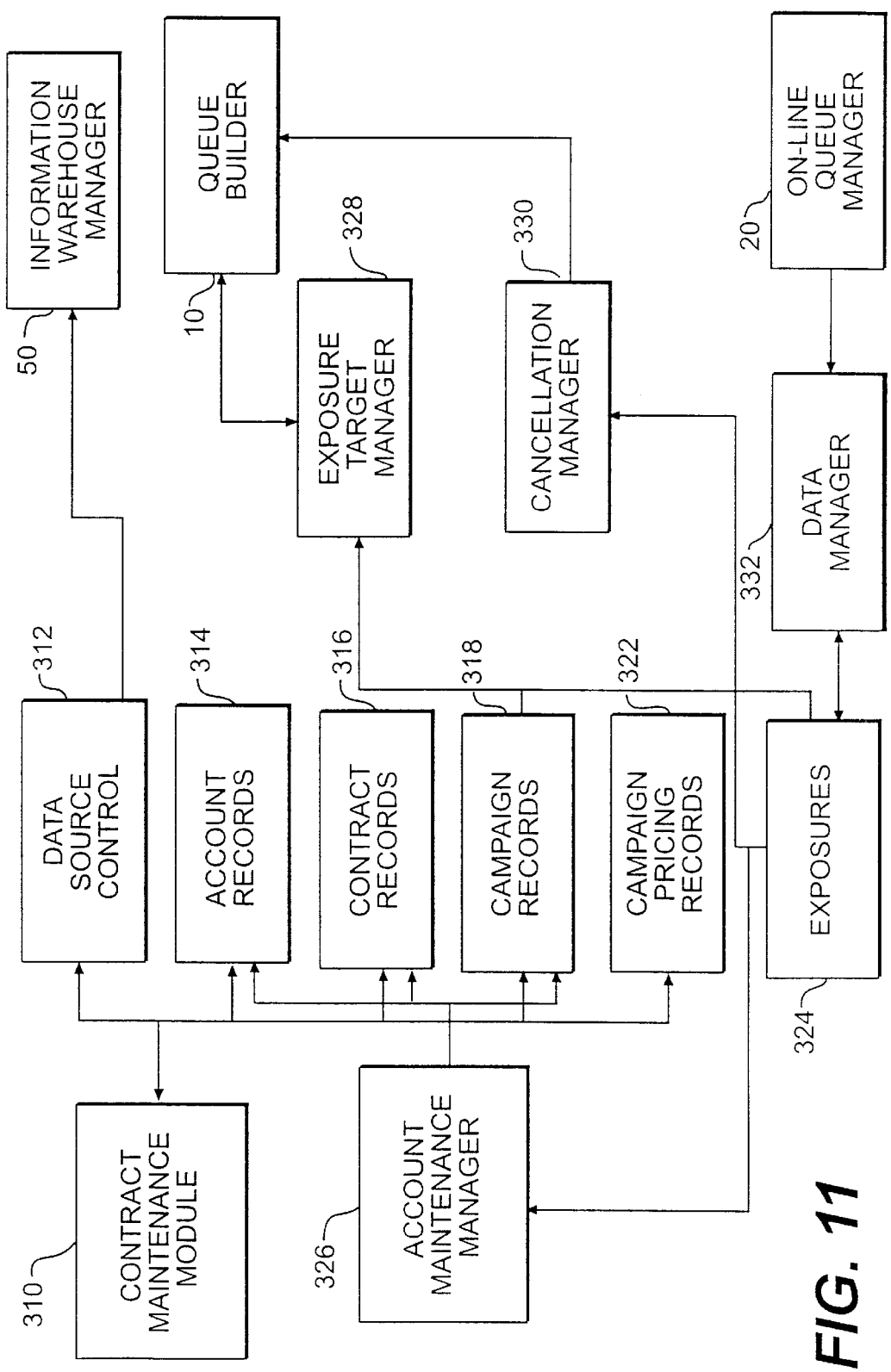
FIG. 11 illustrates a more detailed block diagram of the Exposure Accounting Module of FIG. 9.

A more detailed diagram of the exposure accounting module is shown in FIG. 11. As shown in FIG. 11, the contracts maintenance module 310 includes a data source control records 312, account records 314, contract records 316, campaign records 322 and campaign pricing records 322.

Contracts Maintenance Module 310

The contracts maintenance module provides the software necessary to establish the account and campaign information. In the contracts maintenance module 310, account records 314 are created for content owners and advertisers that will engage in target marketing campaigns. The account records 314 maintain general descriptive and identification information about the entity. In addition, the account maintenance routines will maintain the current number of exposures shown for this entity, current billings, and total contract value. Once accounts are established, targeter entities can enter into numerous contracts to undertake advertising/ targeting campaigns. Contract records 316 and campaign records 318 are also entered through the contract maintenance module 310. Each campaign is identified with a unique campaign number and the contract number under which the campaign is executed. In addition, general descriptive information is collected about each campaign. This information includes: a general description of the segments to be delivered, a general description of the target (subscriber profiles, content locations, and/or time periods) of the campaign, priority of exposures, the exposure goal, the minimum exposures required, start date, and end date for the campaign.

Pricing for exposures is driven from a pricing tables that are associated with each campaign. Pricing tables are established for each campaign. These tables define the quantity ranges and prices for exposures delivered by rules that are created in support of the campaign. When campaigns are established by the contracts maintenance module 310, a window is opened to prompt the user to enter pricing information for exposures. Pricing is entered on a per exposure basis within ranges of exposures; as for instance is set forth in TABLE 16 below.

TABLE 16

| from exposure | to exposure | price per exposure |
|---|---|---|
| 1 | 1 | $1,000 |
| 2 | 10000 | $0.25 |
| 10001 | 50000 | $0.10 |

Of course, pricing is established in view of the present campaign and as such involves various criteria such as the priority of exposures, the exposure goal, the minimum exposures required, start date, and end date for the campaign.

In addition to defining pricing for each campaign, the contract maintenance module provides an input screen for defining, and setting the control parameters for external data sources that are allowed for a given campaign and contract. This data is housed in the data source control records 312. Data source control records 312 identify the owner, data content, media type, and file format. Data source control records 312 establishes the number of times the data source can be loaded into the targeting data storage 100 of queue builder 10, and the dates during which the data source is available for use.

A user of the contracts maintenance module 310 can then establish which campaigns are authorized to use these data sources. Only profiles developed under a given campaign can use data sources that are available to that campaign. Data sources can also be authorized for a contract, and therefore all campaigns within that contract. Specific definition of the fields, format, and translation of an external data source is handled in the information warehouse manager 50.

Exposure Billing Module 300

The exposure billing module uses the contract records 316, campaign records 318, and campaign pricing records 322 entered in the contracts maintenance module along with exposure status data from the on-line queue manager 20 to produce and maintain aggregate and detailed exposure billing information. The exposure status data is imported from the on-line queue manager 20 into the exposure accounting storage 320. This import can be set up to run automatically at fixed intervals (every hour, day, two days, etc.) or can be executed manually. An exposure accounting data manager 332 determines the date and time of the last import, and retrieves all exposure status data that has been updated since the last import. The exposure accounting data manager 332 also provides a mechanism for removing records from the exposure accounting storage 320 that have already been used for billing purposes. The data manager 332 ensures that the data in the exposure accounting storage 320 is up to date and complete.

Once the exposure data is loaded into the exposure accounting storage 320, several processes are performed on the data. The first process is to evaluate exposure performance against the exposure targets set up for each campaign. The exposure records are returned with a rule id that indicates the rule that created the priority queue record that was evaluated by the on-line queue manager 20 when the specific segment was returned a play list and the exposure was created.

An exposure target manager 328 maintains an aggregate exposure count for each rule that has caused an exposure. The aggregate exposure count is only maintained for rules that are related to currently active campaigns. An aggregate exposure count is then computed for each active campaign. While many algorithms can be constructed to enhance the priority of rules that are not producing enough exposures, the preferred implementation of the invention uses the following mechanism.

For each active campaign, the exposure target manager 328 determines the percent of time left in the campaign [PercentTime=(end date−current date)/(end date−start date)]. If the campaign is greater than 50% complete in terms of time, the exposure target manager 328 then computes the aggregate exposures as a percent of the target for the campaign [PercentExposures=campaign aggregate exposures/target exposures]. If the percent of target exposures is less than the percent of time completed in the campaign, then the rules generating the exposures are not producing enough exposures to satisfy the contract requirements. In this case the exposure target manager 328 modifies the rules in the targeting data base by increasing the priorities for all rules in a campaign that is behind target on aggregate exposures. The exposure target manager 328 selects each rule related to the campaign and increases the priority by the percentage difference between the elapsed time and the PercentTime and the PercentExposures for the campaign [NewPriority=MAX(100, (OldPrioirty*(1+(PercentTime−PercentExposures)))]. The rule record is modified by changing the priority value. Once modified the rule record is written to the targeting data base so that the next run of the queue generator 140 uses the new priority in establishing the priority queues that will be sent to the on-line queue manager 20.

The second process ensures that all exposure status records with a status of canceled are not targeted to the subscriber in the future. This process is accomplished by the cancellation manager 330. The cancellation manager 330 is a program that creates new rules that ensure that the cancellation request made by the subscriber is carried out. These new rules are called cancellation rules. The cancellation manager 330 queries the exposures records 324 for any that have a valid CancelFlag value. For each exposure record with a valid CancelFlag value a cancellation rule is generated and written to the targeting data base 100. For all new cancellation rules, the target entity type is "Subscriber", the target object type Is "base entity record", and the target object id is set to the subscriber id from the current exposure status record. The priority field of each new cancellation record is 0, which ensures the segment is never shown to the identified subscriber. The max. frequency and max. repeat fields are set to 0. The rule id of the current exposure status record is used to retrieve the original rule that generated the exposure. The valid start and end date fields of the new cancellation rule is set to "base entity record" and the target segment id is set to the value of the segment id in the current exposure status record. If the CancelFlag value is set for all content segments related to the original rule then, the target segment type and target segment id fields of the new cancellation rule are set to the values in the original rule record. The campaign id for the new cancellation rule is set to "user canceled".

At this point the new cancellation record is written to the targeting data base 100 to ensure that cancellation request is reflected in future priority queues. Finally if the CancelFlag value is set to no targeted content at all, the record in the Subscriber table in the targeting data base 100 is updated to show that no content is to be targeted.

The exposure billing module 300 also provides standard exposure reporting and data export facilities to support billing and invoicing for exposures delivered by the on-line queue manager 20. The exposure accounting report, created by the exposure billing routines, presents the aggregate number of exposures for each customer and the total price for these exposures. The exposure prices are computed using the pricing tables associated with each campaign. Every exposure has a rule reference embedded in it. Exposures are aggregated for each rule. Aggregate exposures for each campaign are computed by adding all of the aggregate exposures for each rule related to that campaign. The total exposures for the campaign are then compared to the pricing table, and the total price for all exposures is calculated. The exposure billing report then presents the total amount due (price of all exposures to date) for each contract, and each campaign within a contract. In addition, exposure counts are presented for each rule within each campaign. The report describes the target object and content segment(s) for each rule and the number of exposures delivered. The result is a report that shows the current amount due for each customer, contract, and campaign; and detailed exposure information for each target audience and which content segment is targeted by a rule within specific campaigns.

Alternatively, the exposure billing routines provide an ad hoc query mechanism that will allow marketing analysts to further explore the demographics of the exposures achieved during a campaign. The query tools will access the exposure accounting data base for information about exposures, and the targeting data base for demographic information about subscribers who have been exposed to content segments by the invention.

Overall System Overview

Figure 10:
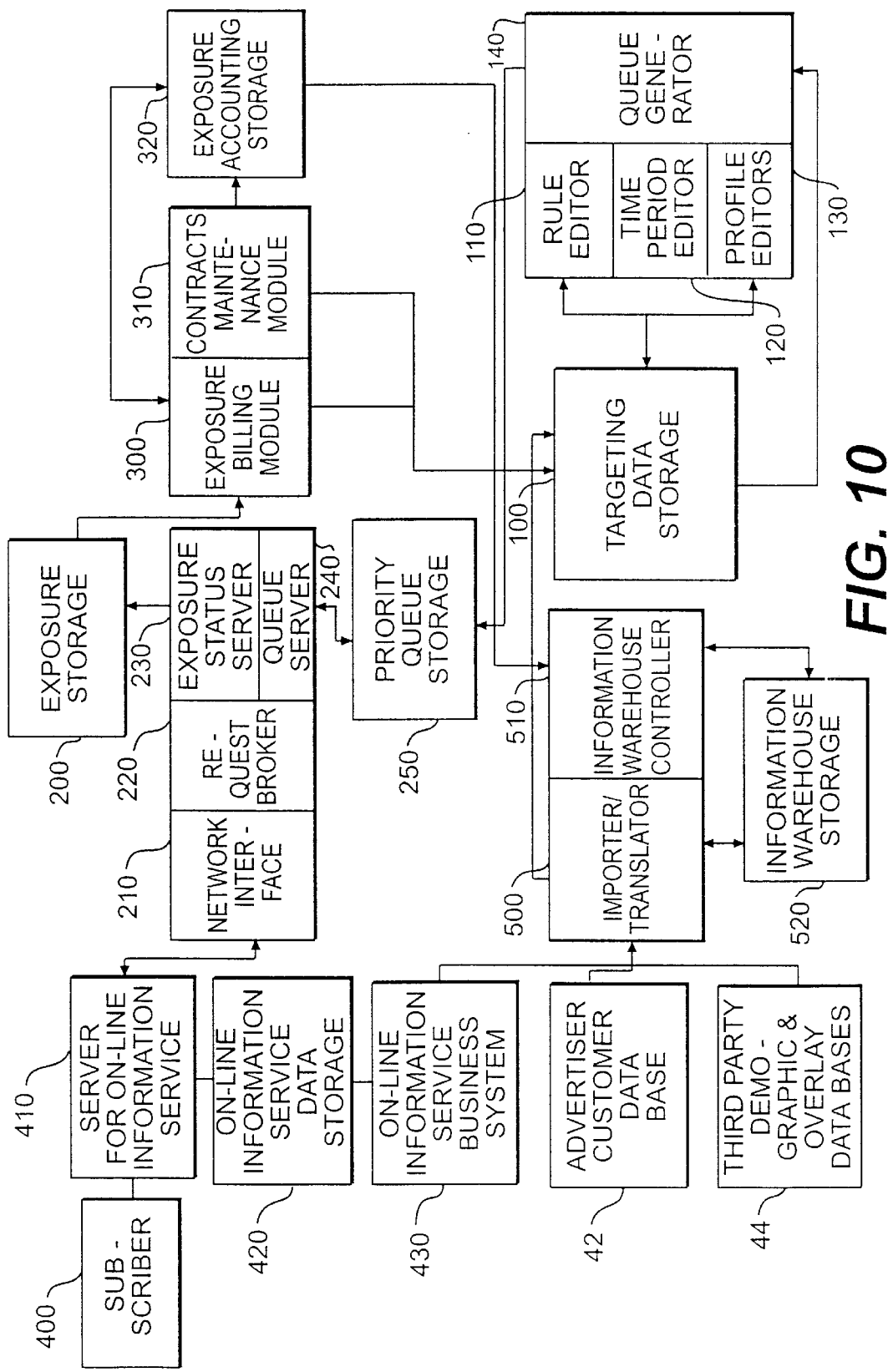
FIG. 10 illustrates an overall system overview of a preferred embodiment of the present invention.

An overall system overview diagram is shown in FIG. 10. This Figure combines the overview FIGS. 3, 5, 7 and 9 as well as FIG. 2. The numerals used in this Figure have been previously identified and described. Therefore, a detailed discussion of this Figure is omitted.

While the present invention has been disclosed with particular reference to the specific embodiments disclosed, one of ordinary skill in the art would be enabled by this disclosure to make various modifications to those embodiments and still be within the scope and spirit of the present invention as recited below in the appended claims.

What is claimed is:

1. A method of operating a computerized system that targets advertisements to users of a communications network, comprising:

defining advertising campaigns and defining advertisements to be displayed to users of the communications network in accordance with the advertising campaigns and targeting criteria associated therewith;

defining an advertising sequence which requires that a series of said advertisements be displayed to a user in a sequential order;

receiving requests for advertisements from applications running on the communications network;

in response to a request for an advertisement, selecting an advertisement from said advertisements in accordance with an advertisement selection process and providing an identification of the selected advertisement to the requesting application, wherein the advertising selection process selects the advertisement based on a prioritized collection of said advertisements;

determining whether the selected advertisement is part of said advertising sequence;

if the selected advertisement is part of said advertising sequence, modifying the advertisement selection process such that a next advertisement in the advertising sequence is selected in response to a next request for an advertisement in connection with a same user to which the previously selected advertisement in the advertising sequence was provided.

2. The method as defined in claim 1, further including assigning values to each of the advertisements, wherein each value indicates a present importance of the advertisement relative to the other advertisements based on at least one predetermined criteria, and further including using the values in the advertising selection process to select an advertisement in response to a request for an advertisement from an application running on the communications network.

3. The method of claim 2, further including:

defining exposure goals for the advertising campaigns;

monitoring exposures of advertisements in the network for each advertising campaign;

determining for each campaign if a current number of exposures for the campaign is consistent with the exposure goal for the campaign; and if the current number of exposures for a campaign is not consistent with the exposure goal for the campaign, adjusting at least one of the values in order to influence which advertisement is selected in response to future requests from the network.

4. The method of claim 3, wherein determining whether a current number of exposures is consistent with the exposure goal for the campaign includes comparing a percentage of the current number of exposures to the desired number of exposures with a percentage of an amount of time the campaign has been running to the given period of time for the campaign.

5. The method of claim 3, wherein determining if a current number of exposures is consistent with the exposure goal of the campaign includes determining if the campaign is behind or ahead of schedule relative to the exposure goal.

6. The method of claim 5, wherein, if it is determined that the campaign is behind schedule, adjusting at least one of the values includes increasing a value of an advertisement associated with the campaign in order to increase future exposures thereof.

7. The method of claim 5, wherein, if it determined that the campaign is ahead of schedule, adjusting at least one of the values includes decreasing a value of an advertisement associated with the campaign in order to reduce future exposures thereof.

8. A method of operating a computerized system that targets advertisements to users of a communications network, comprising:

defining advertising campaigns and defining advertisements to be displayed to users of the communications network in accordance with the advertising campaigns and targeting criteria associated therewith;

defining an advertising sequence which requires that a series of said advertisements be displayed to a user in a sequential order;

defining an exposure delay for the advertising sequence, wherein the exposure delay defines an approximate amount of time that should pass before a next advertisement in the advertising sequence is selected following the selection of a previous advertisement in the advertising sequence;

receiving requests for advertisements from applications running on the communications network;

in response to a request for an advertisement, selecting an advertisement from said advertisements in accordance with an advertisement selection process and providing an identification of the selected advertisement to the requesting application, wherein the advertising selection process selects the advertisement based on a prioritized collection of said advertisements;

determining whether the selected advertisement is part of said advertising sequence;

if the selected advertisement is part of said advertising sequence, modifying the advertisement selection process such that a next advertisement in the advertising sequence is selected in response to a next request after the exposure delay for an advertisement in connection with a same user to which the previously selected advertisement in the advertising sequence was provided.

9. The method as defined in claim 8, further including assigning values to each of the advertisements, wherein each value indicates a present importance of the advertisement relative to the other advertisements based on at least one predetermined criteria, and further including using the values in the advertising selection process to select an advertisement in response to a request for an advertisement from an application running on the communications network.

10. The method of claim 9, further including:

defining exposure goals for the advertising campaigns;

monitoring exposures of advertisements in the network for each advertising campaign;

determining for each campaign if a current number of exposures for the campaign is consistent with the exposure goal for the campaign; and if the current number of exposures for a campaign is not consistent with the exposure goal for the campaign, adjusting at least one of the values in order to influence which advertisement is selected in response to future requests from the network.

11. The method of claim 10, wherein determining whether a current number of exposures is consistent with the exposure goal for the campaign includes comparing a percentage of the current number of exposures to the desired number of exposures with a percentage of an amount of time the campaign has been running to the given period of time for the campaign.

12. The method of claim 10, wherein determining if a current number of exposures is consistent with the exposure goal of the campaign includes determining if the campaign is behind or ahead of schedule relative to the exposure goal.

13. The method of claim 12, wherein, if it is determined that the campaign is behind schedule, adjusting at least one of the values includes increasing a value of an advertisement associated with the campaign in order to increase future exposures thereof.

14. The method of claim 12, wherein, if it determined that the campaign is ahead of schedule, adjusting at least one of the values includes decreasing a value of an advertisement associated with the campaign in order to reduce future exposures thereof.

* * * * *